US006954856B1

(12) United States Patent
Kohashi et al.

(10) Patent No.: US 6,954,856 B1
(45) Date of Patent: Oct. 11, 2005

(54) ADDITIONAL INFORMATION EMBEDDING METHOD, ADDITIONAL INFORMATION DETECTING METHOD, ADDITIONAL INFORMATION EMBEDDING APPARATUS AND ADDITIONAL INFORMATION DETECTING APPARATUS

(75) Inventors: Takashi Kohashi, Tokyo (JP); Akira Ogino, Tokyo (JP); Hiroyuki Kimura, Kanagawa (JP); Hiroshi Yoshiura, Tokyo (JP); Yoshiaki Moriyama, Saitama (JP); Kazumi Sugaya, Saitama (JP)

(73) Assignees: Sony Corporation, Tokyo (JP); Pioneer Corporation, Tokyo (JP); Hitachi, Ltd., Tokyo (JP)

( * ) Notice: Subject to any disclaimer, the term of this patent is extended or adjusted under 35 U.S.C. 154(b) by 0 days.

(21) Appl. No.: 09/510,438

(22) Filed: Feb. 21, 2000

(30) Foreign Application Priority Data

Feb. 22, 1999 (JP) ................................ 11-043383

(51) Int. Cl.[7] ................................................ H04L 9/00
(52) U.S. Cl. ...................................... 713/176; 380/201
(58) Field of Search ......................... 713/176; 380/201

(56) References Cited

U.S. PATENT DOCUMENTS

| | | | | |
|---|---|---|---|---|
| 5,809,139 | A * | 9/1998 | Girod et al. | 380/202 |
| 5,960,081 | A * | 9/1999 | Vynne et al. | 713/176 |
| 5,991,426 | A * | 11/1999 | Cox et al. | 382/100 |
| 6,246,775 | B1 * | 6/2001 | Nakamura et al. | 382/100 |
| 6,389,032 | B1 * | 5/2002 | Cohen | 370/412 |

FOREIGN PATENT DOCUMENTS

| | | |
|---|---|---|
| EP | 0 955 773 | 11/1999 |
| EP | 0 957 637 | 11/1999 |

* cited by examiner

*Primary Examiner*—Gilberto Barrón
*Assistant Examiner*—Grigory Gurshman
(74) *Attorney, Agent, or Firm*—Frommer Lawrence & Haug LLP; William S. Frommer

(57) ABSTRACT

An apparatus and method for embedding additional information embeds plural pieces of additional information on a signal as electronic watermark information. In detail, plural pieces of additional information to be embedded on a signal are generated, the additional information is converted into electronic watermark information, the sizes of embedding parts for respective electronic watermark information are defined under control, and the electronic watermark information is embedded on the signal based on the control signal. Therefore, the additional information are embedded so that additional information having a higher significance degree can be more reliably and rapidly detected.

18 Claims, 12 Drawing Sheets

EXAMPLE OF COPY CONTROL INFORMATION AND APS INFORMATION

| COPY CONTROL INFORMATION | APS INFORMATION | AGC PULSE | COLOR STRIPE |
|---|---|---|---|
| 00 / 00 | Don't Care | OFF | OFF |
| 11 / 01 | 0 0 | | |
| | 0 1 | ON | |
| | 1 0 | ON | 2Line |
| | 1 1 | ON | 4Line |

ADDITIONAL INFORMATION
BEFORE SPREAD SPECTRUM

ADDITIONAL INFORMATION
SPECTRUM AFTER SPREAD SPECTRUM

SPECTRUM OF INFORMATION SIGNAL HAVING
ADDITIONAL INFORMATION SS EMBEDDED THEREON

SIGNAL SPECTRUM AFTER DE-SPREAD SPECTRUM

ADDITIONAL INFORMATION EMBEDDING METHOD, ADDITIONAL INFORMATION DETECTING METHOD, ADDITIONAL INFORMATION EMBEDDING APPARATUS AND ADDITIONAL INFORMATION DETECTING APPARATUS

BACKGROUND OF THE INVENTION

1. Field of the Invention

The present invention relates to an additional information embedding method, additional information detecting method, additional information embedding apparatus and additional information detecting apparatus which are utilized to embed plural pieces of additional information, for example, on a video signal as electronic watermark information, and to detect the plural pieces of additional information from the video signal.

2. Description of the Related Art

Increasingly spreading digital contents such as the Internet, compact discs (CD), digital video discs (DVD) have given rise to a problem of copyright infringement due to unauthorized copies of such digital contents. To solve this problem, a copy control scheme has been contemplated, where additional information for copy control (hereinafter referred to as the "copy control information") is embedded on digital contents by electronic watermark processing to prevent unauthorized copies.

The electronic watermark processing adds information as noise, to a portion existing in a video signal or an audio signal which is not important from a viewpoint of human's perception, i.e., to a portion which is not redundant for music or video. Such information added to a video signal or an audio signal by the electronic watermark processing is hard to remove from the video signal or the audio signal. On the other hand, even if a video signal or an audio signal has been filtered or data-compressed, additional information indicative of an electronic watermark (electronic watermark information) added thereto can be detected from the filtered or compressed video signal or audio signal.

With the foregoing copy control scheme utilizing the watermark processing, added additional information may represent four conditions:

(1) "Copy Free";

(2) "Copy Once";

(3) "No More Copy"; and (4) "Never Copy"

so as to set forth the copy generation and copy limiting conditions for video signals and audio signals on which the electronic watermark information is embedded.

(1) "Copy Free" indicates that audio signals and video signals may be freely copied. (2) "Copy Once" indicates that audio signals and video signals may be copied only once. (3) "No More Copy" indicates that audio signals and video signals are not allowed to be copied any more because the audio signals and video signals which might be copied once already (in the (2) state). (4) "Never Copy" indicates that copies are absolutely prohibited.

With such electronic watermark information indicative of a copy generation and copy limiting conditions added to a video signal or an audio signal, when the video signal or the audio signal is to be copied, the electronic watermark information added to the video signal or the audio signal to be copied is detected in a recording apparatus. Then, the recording may be controlled in accordance with the copy generation and copy limiting conditions indicated by the detected electronic watermark information to ensure that content information such as video signals and audio signals are protected from unauthorized copies.

Recently, however, there is an increasing request for embedding, as electronic watermark information, a variety of further additional information (additional data) such as copyright information, in addition to the copy control information, on content information.

As an example of additional data, if copyright information to specify a copyright owner is embedded on content information as electronic watermark information, this may be detected as required to identify the copyright owner. Therefore, even if the content information on which the copyright information is embedded as electronic watermark information is illegally copied, the copyright information added as electronic watermark information may be detected from the illegally copied content information to identify the legal copyright owner, thereby making it possible to facilitate the exposure of unauthorized copies.

As mentioned above, the additional data is not such highly significant information that is always required upon copy, like the copy control information, but is relatively less significant information which is sufficient if it can be detected as required.

In the case where plural pieces of additional information having different significance degrees, like copy control information and additional data, are embedded on content information as electronic watermark information, the electronic watermark information indicating the more significant additional information, for example, the electronic watermark information indicating the copy control information may be detected with difficulties. In this case, the difficulties in detection would cause an additional problem of a failure in reliable and rapid copy control.

SUMMARY OF THE INVENTION

In view of the foregoing, an object of this invention have been achieved by the provision of an additional information embedding apparatus and method for embedding plural pieces of additional information having different significance degrees on a video signal as electronic watermark information so that higher significant additional information can be more reliably and more rapidly detected, and of an additional information detecting apparatus and method for detecting the additional information embedded on the video signal as electronic watermark information.

The additional information detecting apparatus and method according to the present invention is to generate plural pieces of additional information to be embedded on a signal, to convert each of the additional information into electronic watermark information, to control the size of the embedding area for each of the electronic watermark information in accordance with the significance degree of the corresponding additional information, and to embed the electronic watermark information on the signal based on the control signal.

In the additional information embedding apparatus and method according to present invention, in the case where plural pieces of additional information having different significance degrees are embedded on a video signal as electronic watermark information, the size of a embedding area on for embedding additional information having a higher significance degree as electronic watermark information is set so as to be larger than the size of a embedding area for embedding additional information having a lower significance degree as electronic watermark information.

In this way, additional information, when embedded on a video signal as electronic watermark information, can be embedded on the video signal so that additional information having a higher significance degree is easier to detect.

Further, in the additional information detecting apparatus and method according to present invention, in the case where each of plural pieces of additional information is detected from a signal having the plural pieces of additional information embedded thereon as electronic watermark information, the electronic watermark information indicating the plural pieces of additional information are separately embedded in embedding areas which are set in accordance with the significance degrees of the corresponding additional information. And additional information indicated by electronic watermark information is detected from each embedding area, and a detection timing for detecting additional information is generated every embedding area which is set in accordance with the significance degree of the corresponding additional information to utilize the above detection.

In the additional information detecting apparatus and method according to the present invention, a embedding area for embedding an additional information having a higher significance degree as electronic watermark information is set to be larger. Then, additional information embedded as electronic watermark information is detected from each embedding area.

This ensures to reliably detect each of plural pieces of additional information having different significance degrees embedded on a video signal as electronic watermark information, wherein additional information having a higher significance degree can be more reliably and rapidly detected.

The nature, principle and utility of the invention will become more apparent from the following detailed description when read in conjunction with the accompanying drawings in which like parts are designated by like reference numerals or characters.

DETAILED DESCRIPTION OF THE DRAWINGS

Preferred embodiments of this invention will be described with reference to the accompanying drawings:

In the following, an additional information embedding method, additional information detecting method, additional information embedding apparatus and additional information detecting apparatus will be described in connection with their respective embodiments with reference to the accompanying drawings.

In the embodiments described below, the additional information embedding method and additional information embedding apparatus according to the present invention will be described as applied to a so-called authoring apparatus for creating a digital video disc (hereinafter abbreviated as the "DVD") which has video signals recorded thereon. On the other hand, the additional information detecting method and additional information detecting apparatus according to the present invention will be described as applied to a recording/reproducing apparatus which has a dubbing function for reproducing video signals recorded on a DVD to copy the reproduced video signals on another recording medium, for example, a data rewritable DVD or the like.

Here, the authoring apparatus is used on the content information provider which records content information (information signals) such as video signals and audio signals on DVDs for distribution, while the recording/reproducing apparatus having a dubbing function is provided for consumers' family use.

As will be also described later, on a video signal to be recorded on a DVD by the authoring apparatus, plural pieces of additional information having different significance degrees are embedded as electronic watermark information. In the embodiments described below, the electronic watermark information is implemented as a spread spectrum signal which is formed by a spread spectrum using a Pseudorandom Noise (PN) sequence code (hereinafter referred to as the "PN code").

While in the embodiments explained below, the authoring apparatus and the recording/reproducing apparatus having a dubbing function are also capable of processing audio signals as well as video signals, and the explanation on an audio signal system will be omitted for simplifying the description.

First Embodiment

[About Authoring Apparatus]

Figure 1:
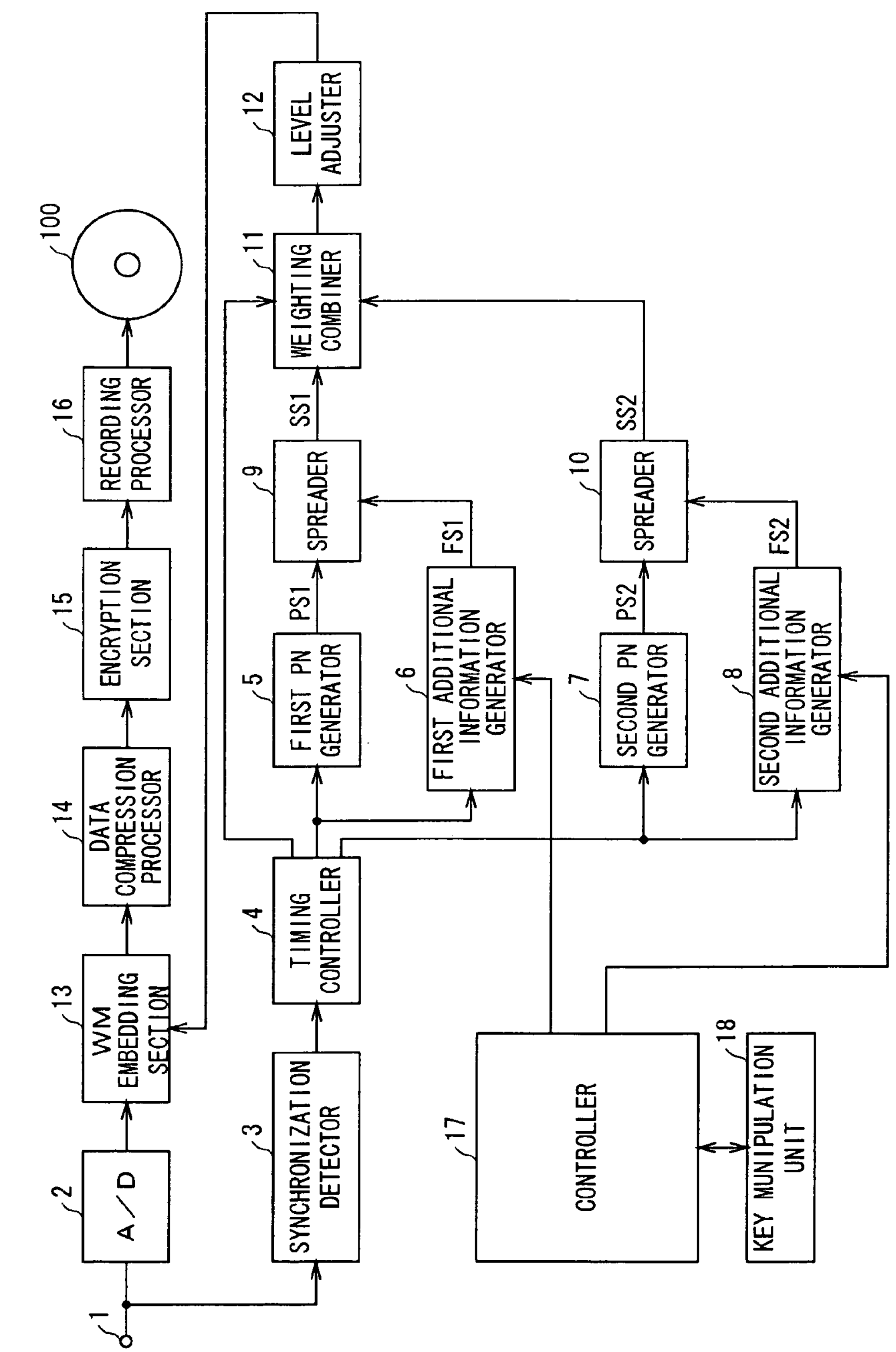
FIG. 1 is a block diagram explaining an authoring apparatus to which an embodiment of an additional information embedding method and additional information embedding apparatus according to the present invention are applied.

FIG. 1 is a block diagram explaining an authoring apparatus according to this embodiment. As illustrated in FIG. 1, the authoring apparatus of this embodiment comprises: an analog video signal input terminal 1; an A/D converter 2; a synchronization detector 3; a timing controller 4; a first PN generator 5; a first additional information generator 6; a second PN generator 7; a second additional information generator 8; spreaders 9, 10; a weighting combiner 11; a level adjuster 12; an electronic watermark information embedding section (hereinafter referred to as the "WM embedding section." WM is an abbreviation of electronic watermark information) 13; a data compression processor 14; an encryption section 15; a recording processor 16; a controller 17; and a key manipulation unit 18. A recording medium 100 is a DVD in this embodiment.

In the authoring apparatus of this embodiment, the controller 17 may be a microcomputer which includes a CPU, a ROM, a RAM and so on. The controller 17 can control each section of this authoring apparatus in accordance with instructions which are input with the key manipulation unit 18 by a user.

The authoring apparatus of this embodiment is configured to embed two pieces of additional information having different significance degrees, i.e., first additional information having a higher significance degree and second additional information having a significance degree lower than that of the first additional information, as electronic watermark information on a video signal within one frame screen (within one frame) which is recorded on the DVD 100. This embodiment will first be explained for the two pieces of additional information having different significance degrees which are embedded on the video signal.

Figures 2A, 2B:
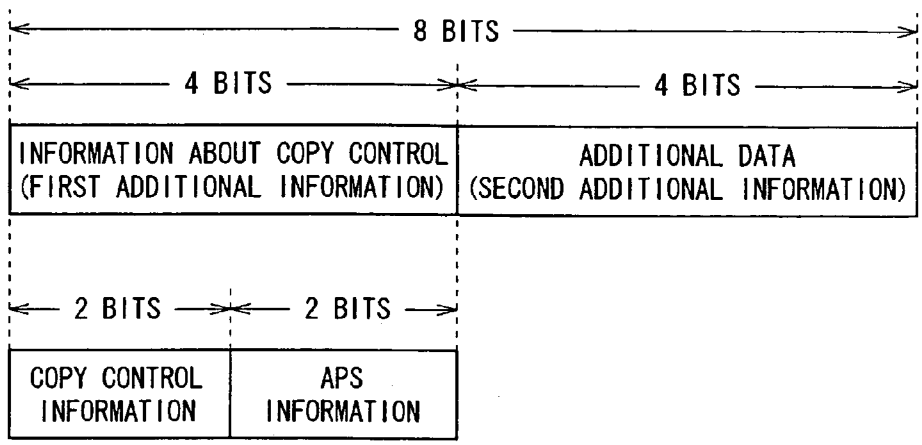
FIGS. 2A and 2B are diagrams explaining two pieces of information having different significance degrees which are embedded on a video signal in the authoring apparatus illustrated in FIG. 1.

FIGS. 2A and 2B are diagrams explaining the first additional information and the second additional information which have different significance degrees from each other and are embedded on a video signal to be recorded on the DVD 100 as electronic watermark information by the authoring apparatus illustrated in FIG. 1.

In this embodiment, the first additional information having a higher significance degree is information about copy control, as shown in FIG. 2A. This information about copy control is information for controlling copies of a video signal, which must be reliably and rapidly detected from the video signal to be copied, on execution of a copy. The second additional information having a lower significance degree than the first additional information is so-called additional data including copyright information or the like. This additional information is required to be detected only when required.

The information about copy control and the additional data are both 4-bit information in this embodiment, and the information about copy control is comprised of copy control information for limiting the copy generation mainly for a digital video signal, and analog protection system (APS) information for preventing copies of an analog video signal, as shown in FIG. 2A.

In this embodiment, the copy control information indicates any of the four conditions: (1) "Copy Free"; (2) "Copy Once"; (3) "No More Copy"; and (4) "Never Copy," as described above. In this embodiment, these conditions are represented by two bits as follows:

[00] . . . (1) "Copy Free";
[10] . . . (2) "Copy Once";
[01] . . . (3) "No More Copy"; and
[11] . . . (4) "Never Copy"

The APS information in turn is information for controlling insertion of a pseudo synchronization pulse into an analog video signal for AGC control, and for controlling an inverse burst for color stripe, and is represented by two bits.

With the copy control information and the APS information embedded on a digital video signal as described above, even if the digital video signal is converted into an analog video signal for copy, the copied analog video signal, when reproduced, cannot produce a normal reproduced image due to the pseudo synchronization pulse for AGC control and the inverse burst for color stripe. That is, even if the digital video signal could be copied, no normal image can be reproduced, so that the copied analog video signal cannot be utilized, thereby protecting the benefit of the copyright owner of the video signal from infringement.

FIG. 2B is a correspondence table which relates ON/OFF control for insertion of the AGC synchronization pulse and the burst inverse control for color stripe correspondingly to a combination of the copy control information and the APS information. As described above, the authoring apparatus of this embodiment embeds the information about copy control, composed of the copy control information and the APS information, as the first additional information having the higher significance degree on a video signal as electronic watermark information, in order to more securely protect the benefit of the copyright owner of the video signal.

Further, in the authoring apparatus illustrated in FIG. 1, the first additional information generator 6 is a section which generates the more significant information about copy control composed of the copy control information and the APS information, as will be also described below. The information about copy control, which is generated in the first additional information generator 6, is spread by the spreader 9 using a first PN code generated by the first PN generator 5, to form electronic watermark information (spread spectrum signal) indicating the information about copy control.

Also, in the authoring apparatus illustrated in FIG. 1, the second additional information generator 8 is a section which generates additional data. The additional data generated by the second additional information generator 8 is spread by the spreader 10 using a second PN code generated by the second PN generator 7, to form electronic watermark information (spread spectrum signal) indicating the additional data.

However, it is considered that if the information about copy control and the additional data are separately embedded on a video signal in one screen as electronic watermark information, it is contemplated that the information about copy control, having a higher significance degree, may be detected with difficulties, causing disadvantages that it takes a long time to appropriately control the copy.

To eliminate such disadvantages, it is considered that the information about copy control is given a embedding level (adding intensity) higher than the embedding level of the additional data. That is, the electronic watermark information indicating the more significant additional information is embedded on content information with a higher embedding level than the electronic watermark information indicating the less significant additional information. Therefore, the electronic watermark information indicating the more significant additional information can be reliably and rapidly detected.

However, in the case where the content information is a video signal, the embedding level varying in accordance with the significance degree of additional information would cause a difference in level between a reproduced image of a video signal part in which electronic watermark information indicating more significant information is embedded and a reproduced image of a video signal part in which electronic watermark information indicating relatively less significant information is embedded, which causes a problem in that a reproduced image is easily deteriorated, for example, viewers visually recognizes the level difference.

To avoid this problem, the authoring apparatus of this embodiment separately embeds electronic watermark information indicating the more significant information about copy control and electronic watermark information indicating the additional data, on embedding parts of a video signal. In this event, the embedding parts are determined such that a part for the electronic watermark information indicating the information about copy control having a higher significance degree is larger than a part for the electronic watermark information indicating the additional data.

Figure 3:
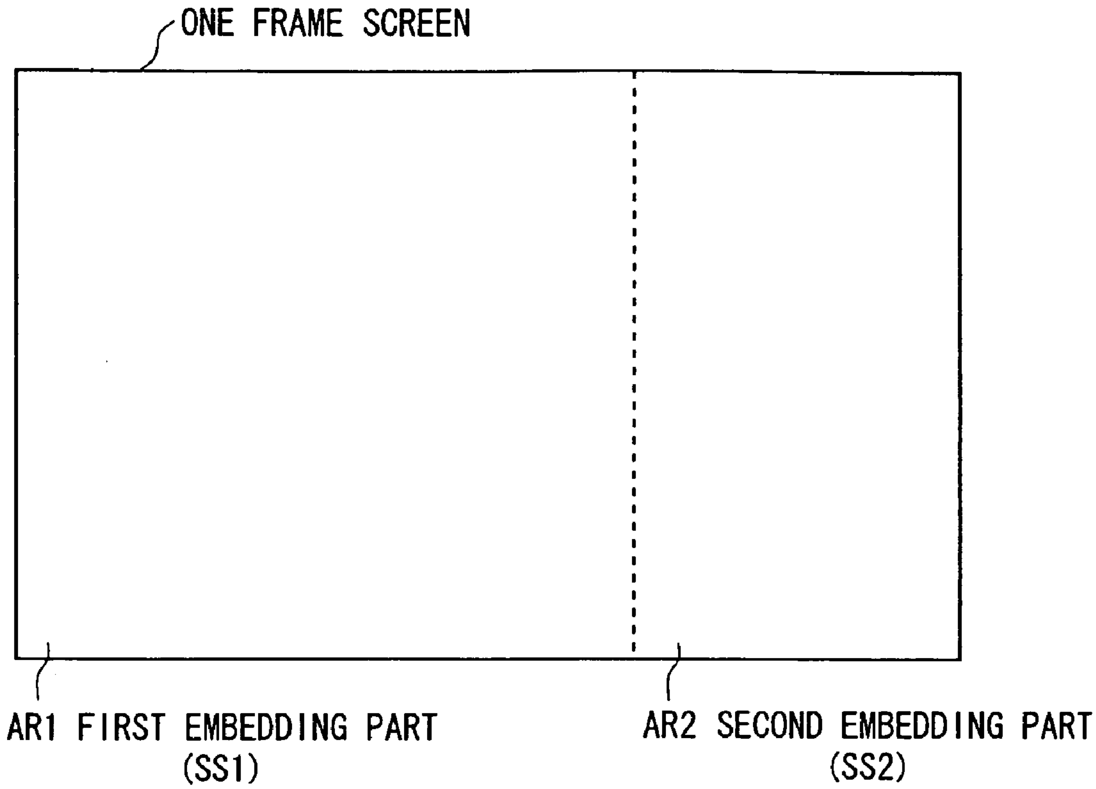
FIG. 3 is a diagram explaining embedding areas for embedding two pieces of additional information having different significance degrees on a video signal as electronic watermark information in the authoring apparatus illustrated in FIG. 1.

FIG. 3 is a diagram explaining a embedding part in which the electronic watermark information indicating the more significant information about copy control is embedded (first embedding part AR1), and a embedding part in which the electronic watermark information indicating the less significant additional data is embedded (second embedding part AR2), in the authoring apparatus of this embodiment.

In the authoring apparatus of this embodiment, the first embedding part AR1 and the second embedding part AR2 are set in one screen such that the embedding part for the information concerning the more significant copy control (first embedding part AR1) is larger than the embedding part for the less significant additional data (second embedding part AR2). Specifically, in this embodiment, the first embedding part AR1 is previously set to be twice the second embedding part AR2.

Then, as shown in FIG. 3, the information about copy control having a higher significance degree is embedded in the first embedding part AR1 as electronic watermark information, and the additional data is embedded in the second embedding part AR2 as electronic watermark information, for each screen (one frame) FL of a video signal.

In this way, in the case where plural pieces of additional information having different significance degrees are embedded on a video signal as electronic watermark information, the embedding part in which the more significant additional information is embedded as electronic watermark information is set larger than the embedding part in which the less significant additional information is embedded as electronic watermark information, so that the more significant additional information can be more reliably and rapidly detected from the additional information embedded on the video signal.

In the following, the authoring apparatus of this embodiment illustrated in FIG. 1 will be explained in detail. An analog video signal to be recorded on the DVD 100 is supplied to the A/D converter 2 and the synchronization detector 3 through the input terminal 1. The A/D converter 2 converts the supplied analog video signal into a digital video signal which is then supplied to the WM embedding section 13.

The synchronization detector 3, in turn, detects a vertical synchronization signal V and a horizontal synchronization signal H from the supplied analog video signal, and supplies these vertical synchronization signal V and horizontal synchronization signal H to the timing controller 4. The timing controller 4 utilizes the vertical synchronization signal V and the horizontal synchronization signal H as reference signals to generate a variety of timing signals such as a PN code reset timing signal RE; a first PN generation enable signal EN1; a second PN generation enable signal EN2; a PN clock signal PNCLK; and a combination timing signal SW.

Here, the PN code reset timing signal (hereinafter simply referred to as the "reset signal") RE indicates a timing at which the generation of a PN code is started. The first PN generation enable signal (hereinafter simply referred to as the "first enable signal") EN1 in turn indicates an interval of generating a first PN code for performing spread spectrum on the information about copy control as the more significant first additional information.

Similarly, the second PN generation enable signal (hereinafter simply referred to as the "second enable signal") EN2 indicates an interval of generating a second PN code used for performing the spread spectrum on the additional data as the second additional information which is less significant than the first additional information.

In this embodiment, the PN clock signal PNCLK indicates a timing at which one chip of the first and second PN codes each is generated. For example, the PN clock signal PNCLK generates one chip of PN code every pixel.

The combination timing signal SW in turn indicates a timing at which the electronic watermark information indicating the information about copy control and the electronic watermark information indicating the additional data are combined such that they can be separately embedded in the first embedding part AR1 and the second embedding part AR2, respectively, which have been defined for each one-frame screen FL of the video signal, as shown in FIG. 3.

Figure 4:
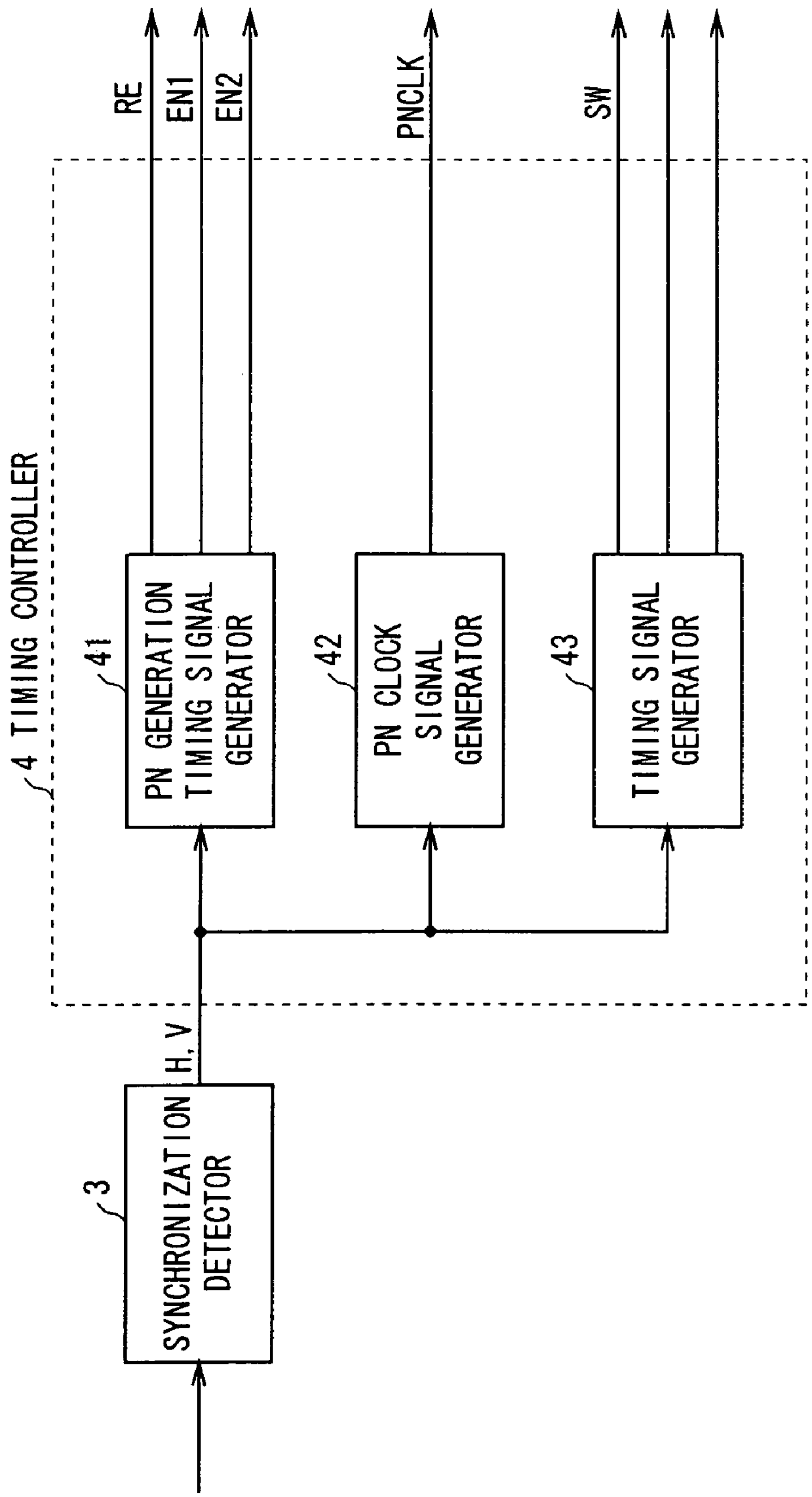
FIG. 4 is a block diagram explaining a timing controller in the authoring apparatus illustrated in FIG. 1.
Figures 5A, 5B, 5C, 5D, 5E, 5F, 5G, 5H:
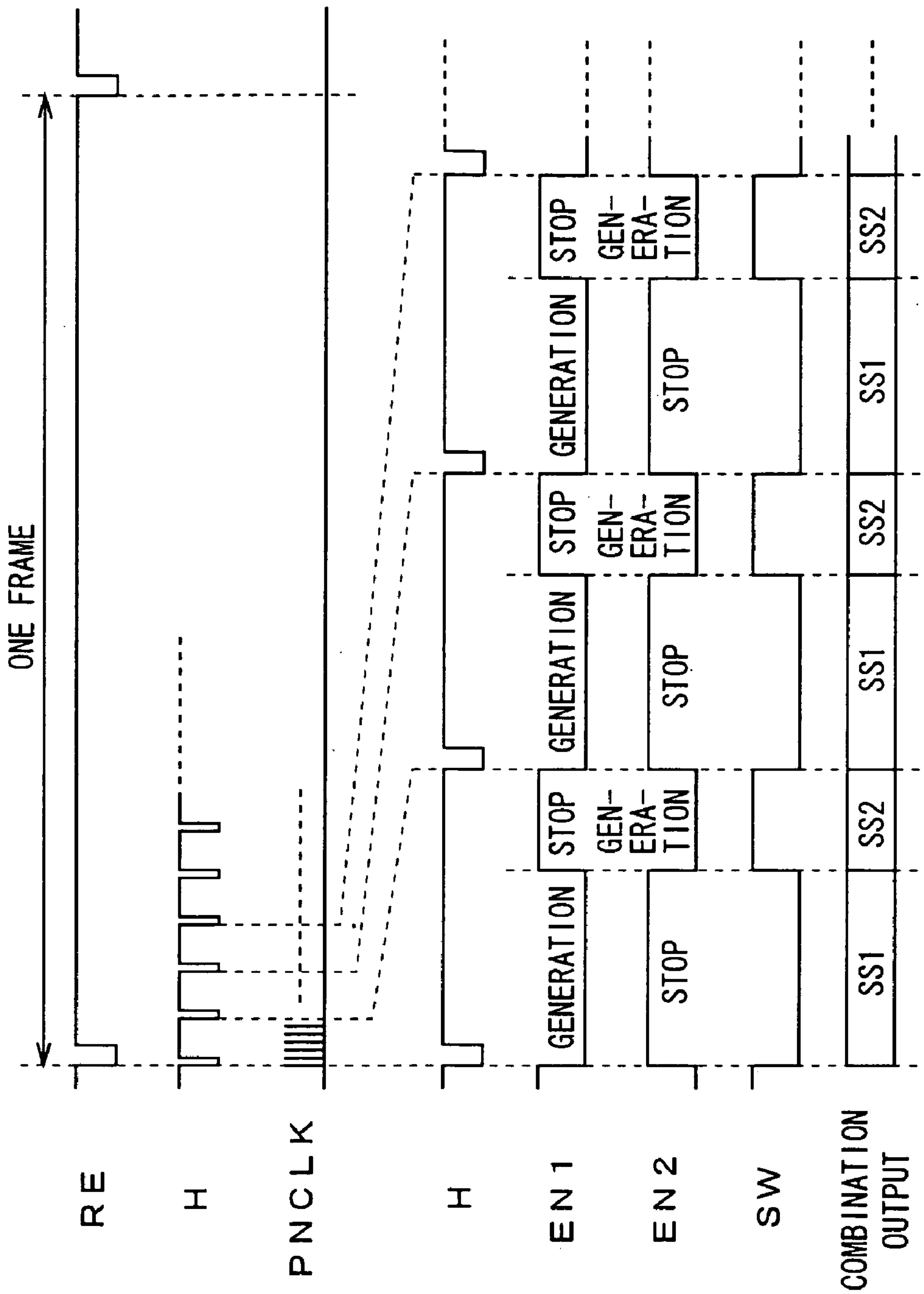
FIGS. 5A to 5H are diagrams explaining timing signals which are generated in the timing controller.

FIG. 4 is a block diagram explaining the timing controller 4 for generating a variety of timing signals for controlling timings of processing in each section of the authoring apparatus. FIG. 5 is a diagram explaining principal timing signals generated by the timing controller 4. Specifically, in FIGS. 5A to 5H, FIG. 5B and FIG. 5D both illustrate the horizontal synchronization signal H, where FIG. 5D illustrates the enlarged view of the horizontal synchronization signal illustrated in FIG. 5B.

As illustrated in FIG. 4, the timing controller 4 comprises a PN generation timing signal generator 41; a PN clock signal generator 42 comprised of a PLL; and a timing signal generator 43.

The PN generation timing signal generator 41 uses the vertical synchronization signal V as a reference signal to generate a reset signal RE having a frame period for defining a cyclic period for a spreading PN code sequence for use in the spread spectrum, as illustrated in FIG. 5A. In this example, the reset signal RE is a signal having a period equal to one frame which falls, for example, at a leading edge of the vertical synchronization signal V.

The PN generation timing signal generator 41, in this example, also uses the vertical synchronization signal V and the horizontal synchronization signal H to generate the first enable signal EN1 and the second enable signal EN2.

In this example, the first enable signal EN1 is a signal which falls at a leading edge of the horizontal synchronization signal H (see FIG. 5D), and has a low level during the former two-third interval of the horizontal line and has at a high level during the subsequent one-third interval, as illustrated in FIG. 5E.

The second enable signal EN2 in turn is a signal which rises at a leading edge of the horizontal synchronization signal H (see FIG. 5D), and has a high level during the former two-third interval of the horizontal line, and has a low level during the subsequent one-third interval, as illustrated in FIG. 5F.

For generating the first enable signal EN1 and the second enable signal EN2, the intervals during which the signals have low levels or the intervals can be set as described above by frequency dividing the horizontal synchronization signal H. Also in this embodiment, the first enable signal EN1 and the second enable signal EN2 are both low active.

Therefore, in each horizontal line period in the vertical direction, the information about copy control having a higher significance degree may be subjected to the spread spectrum in the former two-third interval, and the additional data may be subjected to the spread spectrum in the subsequent one-third interval, as will be also described later.

The PN clock generator 42 uses the PLL to generate the PN clock PNCLK (see FIG. 5C) which is synchronized with the horizontal synchronization signal H. The timing signal generator 43 in turn generates a variety of timing signals for use in the authoring apparatus of FIG. 1 on the basis of the vertical synchronization signal V and the horizontal synchronization signal H. In this embodiment, the timing signal generator 43 generates the combination timing signal SW (see FIG. 5G) indicative of a timing for combining the electronic watermark information indicating the more significant information about copy control and the electronic watermark information indicating the additional data.

Then, out of the signals generated in the timing controller 4, the reset signal RE, the first enable signal EN1 and the PN clock signal PNCLK are supplied to the first PN generator 5, and the first enable signal EN1 and the PN clock signal PNCLK are also supplied to the first additional information generator 6.

The reset signal RE, the second enable signal EN2 and the PN clock signal PNCLK are supplied to the second PN generator 7, and the second enable signal EN2 and the PN clock signal PNCLK are also supplied to the second additional information generator 8. Further, the combination timing signal SW is supplied to the weighting combiner 11.

In this embodiment, the first PN generator 5 and the second PN generator 7 are comprised of multi-stage shift registers, although not shown, each is comprised of several exclusive OR circuits for calculating appropriate tap outputs for the shift registers, in order to generate a PN code sequence based on the timing signal from the timing controller 4.

More specifically, the first PN generator 5 generates a first PN code sequence PS1 in response to the reset signal RE, the first enable signal EN1 and the clock signal PNCLK. The first PN generator 5 is reset by the reset signal RE at every frame period, in this example, such that the PN code sequence PS1 having a predetermined code pattern can be generated from its beginning. Then, the first PN generator 5 generates the PN code sequence PS1 in response to the clock signal PNCLK only when it is brought into a PN code generation enabled state (enable state) by the first enable signal EN1.

In this example, as has been also described above, the first PN generator 5 is brought into the state in which it can generate the first PN code sequence PS1 when the first enable signal EN1 is at a low level. Thus, as illustrated in FIG. 5E, the first PN generator 5 is into the PN code generating state during the two-third interval of one horizontal line from the leading edge of the horizontal synchronization signal H in each horizontal line period in the vertical direction in each one-frame screen, and generates the PN codes at a rate of one chip per one clock of the clock signal PNCLK. In this way, the first PN code sequence PS1 generated in the first PN generator 5 is supplied to the spreader 9.

The first additional information generator 6, on the other hand, generates an information sequence FS1 related to the copy control, comprised of the copy control information and the APS information, as the first additional information having a higher significance degree which is to be embedded on a video signal inputted via the input terminal 1 through spread spectrum, based on the clock PNCLK at a timing of the first enable signal EN1 from the timing controller 3, and supplies the information sequence FS1 to the spreader 9. In other words, the first additional information generator 6 generates the information sequence FS1 related to the copy control at the same timing as the first PN code sequence PS1, and supplies it to the spreader 9.

Similarly, the second PN generator 7 generates the second PN code sequence PS2 in response to the reset signal RE, the second enable signal EN2 and the clock signal PNCLK. The second PN generator 7 is also reset by the reset signal RE at every frame period, so as to generate the PN code sequence PS2 having a predetermined code pattern from its beginning. Then, the second PN generator 7 generates the PN code sequence PS2 in response to the clock signal PNCLK only when it is brought into a PN code generation enabled state (enable state) by the second enable signal EN2.

Therefore, the second PN generator 7 is brought into the state in which it can generate the second PN code sequence PS2 when the second enable signal EN2 is at a low level. Thus, as illustrated in FIG. 5F, the second PN generator 7 is in the PN code generating state in the latter one-third interval of each horizontal line in each horizontal line period in the vertical direction in each screen, and generates the PN codes at a rate of one chip per one clock of the clock signal PNCLK. In this way, the second PN code sequence PS2 generated in the second PN generator 7 is supplied to the spreader 10.

The second additional information generator 8, on the other hand, generates an additional data sequence FS2 which is to be embedded on a video signal inputted via the input terminal 1 through the spread spectrum, based on the clock PNCLK at a timing of the second enable signal EN2 from the timing controller 3, and supplies the additional data sequence FS2 to the spreader 10. In other words, the second additional information generator 8 generates the additional data sequence FS2 at the same timing as the second PN code sequence PS2, and supplies it to the spreader 10.

In the authoring apparatus of this embodiment, the user can give instructions concerning information about copy control generated in the first additional information generator 6 and the additional data generated in the second additional information generator 8, with the key manipulation unit 18.

Specifically, when the user specifies, with the key manipulation unit 18, information about copy control and additional data and additional data, which are embedded on a video signal as electronic watermark information, the controller 17 can control the first additional information generator 6 and the second additional information generator 8 so as to generate the specified information.

The spreader 9 performs the spread spectrum on the information sequence FS1 concerning the copy control with the first PN code sequence PS1, to form electronic watermark information SS1 indicating the information about copy control, and supplies this to the weighting combiner 11. Similarly, the spreader 10 performs the spread spectrum on the additional data sequence FS2 with the second PN code sequence PS2 to form electronic watermark information SS2 indicating the additional data, and supplies this to the weighting combiner 11.

The weighting combiner 11 which has a function as an electronic watermark information combining means, combines the electronic watermark information SS1 indicating the information about copy control and the electronic watermark information SS2 indicating the additional data, based on the combination timing signal SW from the timing controller 4, to form a combined electronic watermark information signal (see FIG. 5H) which is to be embedded on a video signal inputted via the input terminal 1.

In this embodiment, the weighting combiner 11 outputs the electronic watermark information SS1 indicating the information about copy control while the combination timing signal SW illustrated in FIG. 5G is at a low level, and outputs the electronic watermark information SS2 indicating the additional data while the combination timing signal SW is at a high level, in each horizontal line period in the vertical direction, thereby forming a combination signal of the electronic watermark information SS1 indicating the information about copy control and the electronic watermark information SS2 indicating the additional data as shown in FIG. 5H. The combination signal is supplied to the level adjuster 12.

The level adjuster 12 adjusts a embedding level of the combined electronic watermark information signal such that the embedding of the combined electronic watermark information signal on the video signal does not deteriorate an image reproduced from the video signal. In this embodiment, the level adjuster 12 adjusts the embedding level such that the combined electronic watermark information signal is embedded at a level lower than the dynamic range of the video signal.

In this event, while the combined electronic watermark information signal is a combination signal of the electronic watermark information SS1 indicating the information about copy control and the electronic watermark information SS2 indicating the additional data, as described above, the electronic watermark information SS1, SS2 can be separately embedded in the embedding parts of the video signal at the same embedding levels. The combination signal having the adjusted level is supplied from the level adjuster 12 to the WM embedding section 13.

The WM embedding section 13 embeds the combined electronic watermark information signal supplied through the level adjuster 12 on the video signal supplied from the input terminal 1. The video signal on which the electronic watermark information signal is embedded by the WM embedding section 13 is supplied to the data compression processor 14.

The data compression processor 14 compresses data in the supplied video signal having the electronic watermark information signal embedded thereon in accordance with the MPEG scheme. The data-compressed video signal is supplied to the encryption section 15. In this embodiment, the encryption section 15 performs encryption processing in accordance with a content scramble system (CSS) on the video signal. The CSS-based encryption processing is the one which is applied to information signals when information signals such as video signals are recorded on a disc medium such as a DVD for distribution.

The video signal subjected to the encryption processing in the encryption section 15 is supplied to the recording processor 16. The recording processor 16 performs adjustment processing and so on for recording a video signal on the DVD 100, on the supplied video signal to record it on the DVD 100.

As a result, the video signal on which the information about copy control having a higher significance degree (four bits) and the additional data (four bit) having a lower significance degree than the information about copy control is embedded as the electronic watermark information is recorded on the DVD 100.

In this case, as been previously described with reference to FIG. 3, the embedding part for the electronic watermark information SS1 indicating the more significant information about copy control is set larger than the embedding part for the electronic watermark information SS2 indicating the additional data. In this way, the embedding parts, in which the additional information are embedded as electronic watermark information, are set in accordance with the significance degrees of the additional information. However, the electronic watermark information SS1 indicating the information about copy control and the electronic watermark information SS2 indicating the additional data are embedded on a video signal at the same embedding level.

Figure 6A:
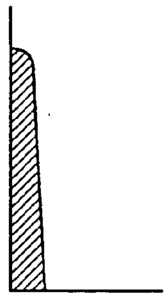
FIGS. 6A to 6D are diagrams explaining the relationship between additional information embedded on a video signal as electronic watermark information (spread spectrum signal) and the video signal as an information signal.
Figure 6B:
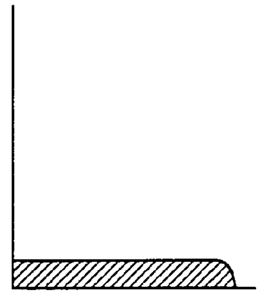

FIGS. 6A to 6D spectrally illustrates a relationship between additional information embedded on a video signal as electronic watermark information, for example, information about copy control, additional data and so on, and an information signal such as a video signal. The additional information such as information about copy control and additional data is a low bit rate signal which includes a small amount of information, and therefore is a narrow band signal as illustrated in FIG. 6A. The additional information becomes a wide bandwidth signal as illustrated in FIG. 6B by the spread spectrum. In this event, the spread spectrum signal level becomes smaller in reciprocal proportion to a band enlarging ratio.

Figure 6C:
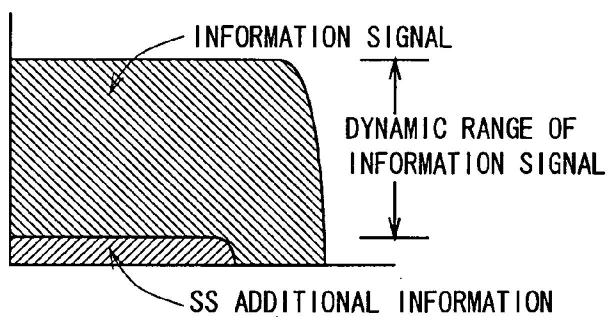

This spread spectrum signal, i.e., the electronic watermark information is embedded on a video signal in the WM embedding section 13, in which case the electronic watermark information is embedded at a level lower than the dynamic range of the video signal as an information signal, as illustrated in FIG. 6C. Such embedding can substantially completely prevent the information signal from degrading. Thus, as described above, when the video signal on which the electronic watermark information is embedded is supplied to a monitor to reproduce an image thereon, a reproduced image is hardly affected by the electronic watermark information and hence is satisfactorily provided.

Figure 6D:
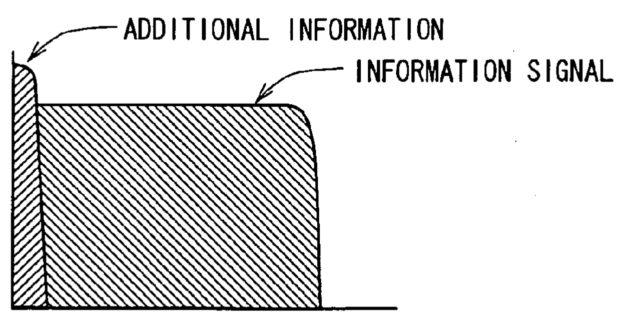

As will be described later, when de-spread spectrum is performed to detect electronic watermark information, the electronic watermark information is returned as a narrow band signal as illustrated in FIG. 6D. By using a sufficient band spreading ratio, the de-spread additional information has larger power than the information signal, and is therefore detectable.

In this event, since electronic watermark information embedded on a video signal is embedded for the same duration of time and at the same frequency as the video signal, the electronic watermark information could not be eliminated or modified by simply replacing a frequency filter or information.

Therefore, the electronic watermark information embedded on the video signal cannot be removed, and is changed with difficulties, so that it can be ensured that the video signal is protected from unauthorized copies by using the information about copy control embedded on the video signal as electronic watermark information.

Then, as has been also described above, when plural pieces of additional information are embedded as electronic watermark information with different embedding levels, it is considered that levels may be different between a reproduced image of a video signal part having additional information embedded therein at a higher embedding level and a reproduced image of a video signal part having additional information embedded therein at a lower embedding level, thereby causing a degradation in a reproduced image. The authoring apparatus of this embodiment, on the other hand, embeds two pieces of additional information having different significance degrees on a video signal at the same embedding level as electronic watermark information, so that it is possible to prevent the embedding of the electronic watermark information on the video signal from degrading the reproduced image of the video signal.

Also, in the authoring apparatus of this embodiment, the embedding part in which the more significant first additional information is embedded as electronic watermark information is set larger than the embedding part in which the second additional information having a lower significance degree than the first additional information is embedded as electronic watermark information.

Therefore, with respect to additional information embedded in the same screen, the more significant additional information which is embedded in the larger area of the video signal can be more reliably and rapidly detected than the less significant additional information.

Further, with respect to the less significant additional information, which is embedded in a smaller embedding part than the more significant additional information, the embedding part is previously set, so that the less significant additional information can also be reliably detected, although a slightly longer detection time is required therefor.

As described above, the authoring apparatus of this embodiment can embed two pieces of additional information having different significance degrees on a video signal in such a manner that a reproduced image will not be degraded and the more significant additional information can be more reliably and rapidly detected.

[About Recording/Reproducing Apparatus having Dubbing Function]

Figure 7:
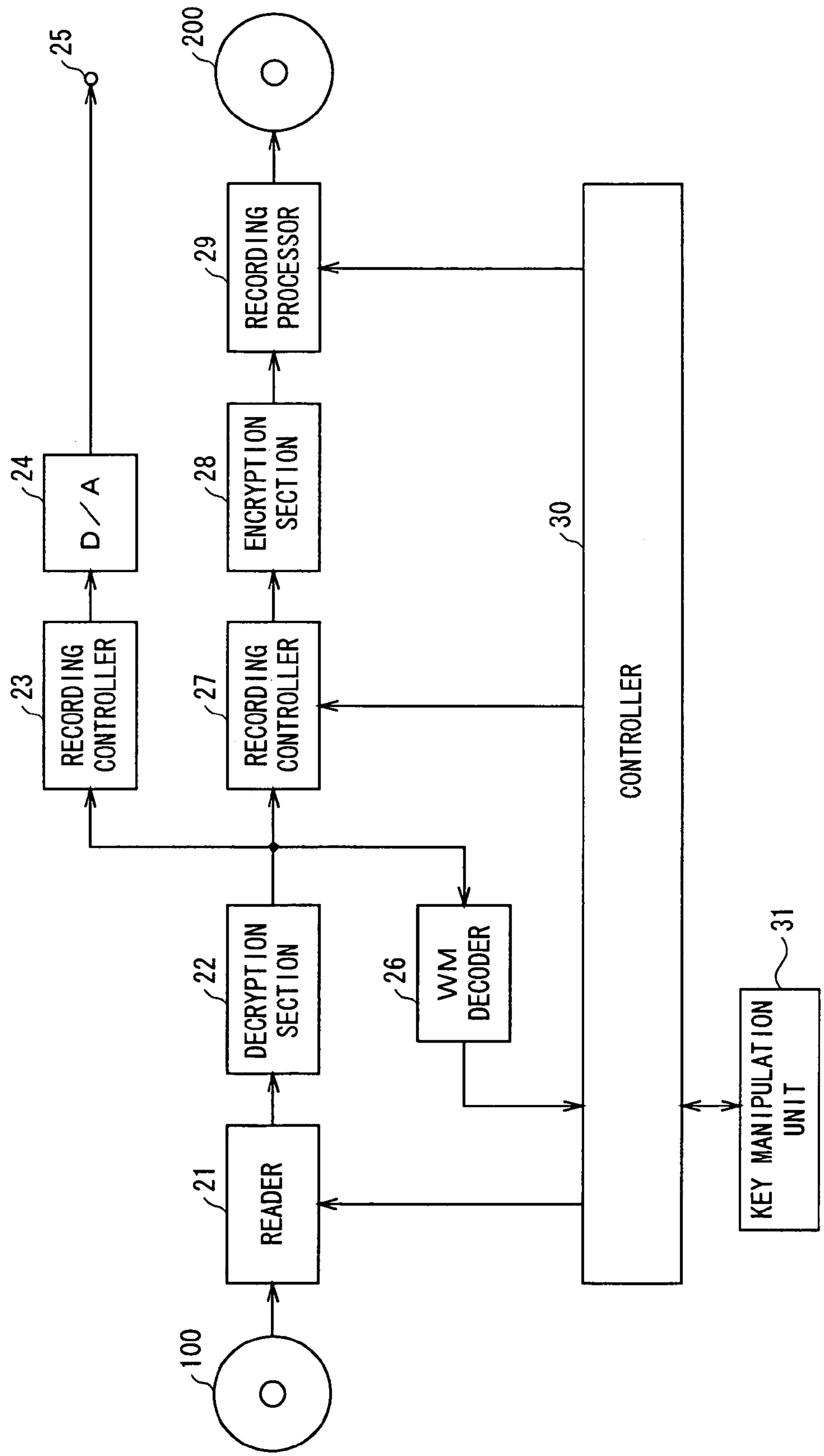
FIG. 7 is a block diagram explaining a recording/reproducing apparatus to which an embodiment of an additional information detecting method and additional information detecting apparatus according to the present invention is applied.

FIG. 7 is a block diagram for explaining a recording/reproducing apparatus of this embodiment. As has been also described above, the recording/reproducing apparatus of this embodiment reads a video signal recorded on a DVD for reproduction, and has a so-called dubbing function for duplicating the read video signal on a data rewritable recording medium.

As illustrated in FIG. 7, the recording/reproducing apparatus of this embodiment comprises: a reader 21; a decryption section 22; a video data decoder 23; a D/A converter 24; an analog video signal output terminal 25; an electronic watermark information decoder (hereinafter simply referred to as the "WM decoder") 26; a recording controller 27; an encryption section 28; a recording processor 29; a controller 30; and a key manipulation unit 31.

A DVD 100 has recorded thereon a video signal on which information about copy control and additional data are embedded as electronic watermark information by the authoring apparatus previously described with reference to FIG. 1. A disc 200 is data rewritable.

When the user gives a command to execute a dubbing function with the key manipulation unit 31, the reader 21 reads a digital video signal recorded on the DVD 100. The read video signal is supplied to the decryption section 22. The decryption section 22 performs decripting processing for decripting the encripted video signal supplied thereto, and supplies the decripted video signal to the video data decoder 23, the WM decoder 26 and the recording controller 27.

Since the decripted video signal has been subjected to the data compression in accordance with a predetermined scheme, for example, the MPEG scheme or the like, it is decoded in the video data decoder 23 in order to be supplied to, for example, a display monitor device. The decoded video signal is supplied to the D/A converter 24 which converts the video signal to an analog signal. The analog signal is then outputted through the analog video signal output terminal 25 and supplied to, for example, a display monitor or a recording device.

The WM decoder 26 in turn detects from the decripted video signal, information about copy control and additional data embedded thereon as electronic watermark information.

Figure 8:
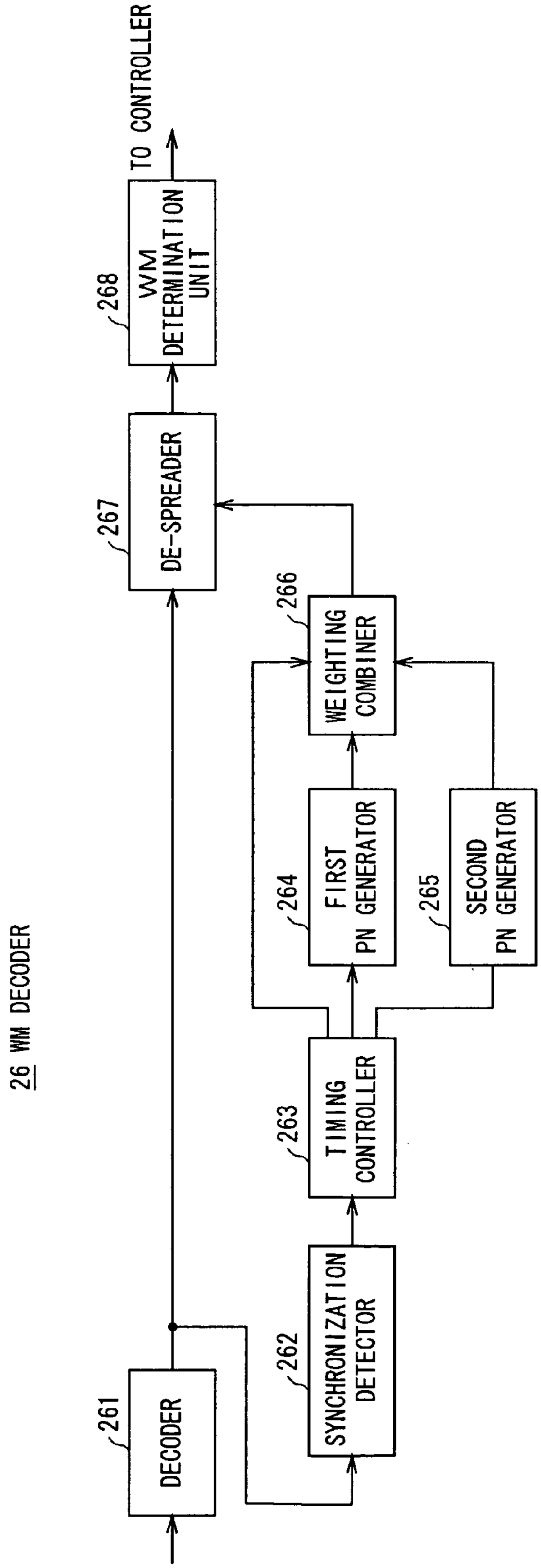
FIG. 8 is a block diagram explaining a WM decoder in the recording/reproducing apparatus illustrated in FIG. 7.

FIG. 8 is a block diagram explaining the WM decoder 26 in the recording/reproducing apparatus of this embodiment. As illustrated in FIG. 8, the WM decoder 26 comprises a decoder 261; a synchronization detector 262; a timing controller 263; a first PN generator 264; a second PN generator 265; a weighting combiner 266; a de-spreader 267; and an electronic watermark information determination unit (hereinafter simply referred to as the "WM determination unit") 268.

As has been also described above, the decripted video signal has been data-compressed in accordance with a predetermined scheme. For this reason, the decoder 261 in the WM decoder 26 decodes the supplied video signal to bring the video signal into a condition in which the information about copy control and so on embedded thereon as electronic watermark information can be detected therefrom. In this case, the decoded video signal is such that a vertical synchronization signal V and a horizontal synchronization signal H can be detected therefrom for use as reference signals. Then, the decoded video signal is supplied to the synchronization detector 262 and the de-spreader 267.

The synchronization detector 262 detects the vertical synchronization signal V and the horizontal synchronization signal H, for use as reference signals, from the decoded video signal, and supplies them to the timing controller 263.

The timing controller 263 is configured substantially in a manner similar to the timing controller 4 in the authoring apparatus previously described with reference to FIGS. 1 and 4. The timing controller 263 in the recording/reproducing apparatus generates timing signals which provide the same timings as the reset signal RE, the first enable signal EN1, the second enable signal EN2, the clock signal PNCLK, and the combination timing signal SW, respectively, which have been used to embed electronic watermark information on a video signal.

Specifically, the timing controller 263 in the WM decoder 26 generates the reset signal RE (see FIG. 5A); the first enable signal EN1 (see FIG. 5E); the second enable signal EN2 (see FIG. 5F); the clock signal PNCLK (see FIG. 5C); and the combination timing signal SW (see FIG. 5G), in a manner similar to the timing controller 4 in the authoring apparatus illustrated in FIG. 1.

Then, out of the timing signals generated in the timing controller 263, the reset signal RE and the clock signal PNCLK are supplied to the first PN generator 264 and the second PN generator 265; the first enable signal EN1 to the first PN generator 264; and the second enable signal EN2 to the second PN generator 265. The combination timing signal SW in turn is supplied to the weighting combiner 266.

The first PN generator 264 and the second PN generator 265 are configured in a manner similar to the first PN generator 5 and the second PN generator 7 in the authoring apparatus previously described with reference to FIG. 1.

The first PN generator 264 is rest every frame based on the reset signal RE, the first enable signal EN1 and the clock signal PNCLK, and generates a first PN code sequence PS1 only while the first enable signal EN1 is at a low level (see FIG. 5E). Stated another way, the first PN generator 264 generates the first PN code sequence PS1 used in the spread spectrum at the same timing at which the information about copy control is subjected to the spread spectrum to be embedded on a video signal. The first PN code sequence PS1 is supplied to the weighting combiner 266.

The second PN generator 265 in turn is reset every frame based on the reset signal RE, the second enable signal EN2 and the clock signal PNCLK, and generates a second PN code sequence PS2 only while the second enable signal EN2 is at a low level (see FIG. 5F). That is, the second PN generator 265 generates the second PN code sequence PS2 used in the spread spectrum at the same timing at which the additional data is subjected to the spread spectrum to be embedded on the video signal. The second PN code sequence PS2 is also supplied to the weighting combiner 266.

The weighting combiner 266, based on the combination timing signal (FIG. 5G) from the timing controller 263, outputs the first PN code sequence PS1 from the first PN generator 264 while the combination timing signal SW is at a low level, and outputs the second PN code sequence PS2 from the second PN generator 265 while the combination timing signal SW is at a high level.

In this way, the first PN code sequence PS1 used in the spread spectrum of the information about copy control, and the second PN code sequence PS2 used in the spread spectrum of the additional data are supplied to the de-spreader 267 for the decoded video signal at the same timing as the spread spectrum of the information about copy control and the additional data.

The de-spreader 267 uses a combined PN code sequence which is a combination of the first PN code sequence PS1 and the second PN code sequence PS2 from the weighting combiner 266 to extract an information sequence FS1 concerning the copy control and an additional data sequence FS2 which are separately embedded in embedding parts every one-frame screen of the video signal, as previously shown in FIG. 3, and supplies the extracted sequences to the WM determination unit 268.

The WM determination unit 268 uses the extraction output from the de-spreader 267 to determine the type of information about copy control comprised of the 4 bits, and the type of additional data comprised of 4 bits, and supplies the determination results to the controller 30.

In this event, as previously shown in FIG. 3, the embedding part AR1 for the information about copy control as electronic watermark information is larger than the embedding part AR2 for the additional data as electronic watermark information. For this reason, the information about copy control can be more correctly and rapidly detected than the additional data. Of course, the additional information can also be detected correctly, although a slightly longer time is required therefor than for the information about copy control.

In this way, the controller 30 can correctly and rapidly acquire the information about copy control. Then, the controller 30 determines, based on the information about copy control from the WM decoder 26, whether the video signal read from the DVD 100 is allowed to be copied or not, and controls the recording controller 27 based on the determination result.

More specifically, the controller 30 forms a control signal for prohibiting a copy when it determines from the 4-bit copy control information embedded on the video signal read from the DVD 100 that 2-bit copy control information indicates copy prohibited, and otherwise forms a control signal for permitting a copy when it determines that the 2-bit copy control information indicates copy free or one copy permitted (copy of one generation permitted). The control signal thus formed is supplied to the recording controller 27.

The recording controller 27 does not allow the decryption section 22 to supply the video signal to the encryption section 28 when the control signal from the controller 30 indicates recording prohibited. Conversely, the recording controller 27 allows the decryption section 22 to supply the video signal to the encryption section 28 when the control signal from the controller 30 indicates recording permitted.

The encryption section 28 receives the supplied video signal, which has been indicated as copy permitted, and encripts the video signal in accordance with a predetermined encryption scheme. The video signal encripted in the encryption section 28 is supplied to the recording processor 29. The recording processor 29 performs processing for recording the encripted video signal on the disc 200.

In the manner described above, the information about copy control and the additional data are embedded on video signals recorded on the DVD 100 as electronic watermark information. Since the information about copy control having a higher significance degree is embedded in the first embedding part AR1 which is larger than the part AR2 for the additional data, the information about copy control can be correctly and rapidly detected from the video signals. Then, based on the detected information about copy control, only the video signals which are determined as copy permitted can be copied on the disc 200 and the video signals which are determined as copy prohibited can not be copied. In this way, it is possible to ensure that the copyright owner of the video signals is protected from suffering a loss due to unauthorized copies of the video signals.

The additional data in turn is embedded in the second embedding part AR2 which is smaller than the embedding part for the information about copy control. Since the second embedding part AR2 is processed to detect the additional data, the additional data embedded on the video signal can be reliably detected as well.

Consequently, even when two pieces of additional information having different significance degrees are separately embedded in embedding parts of one frame screen of a video signal as shown in FIG. 3, the more significant additional information is detected without any difficulties and therefore, each of the additional information can be reliably detected without any difficulties.

The recording/reproducing apparatus of this embodiment illustrated in FIG. 7 can output an analog video signal via the output terminal 25, so that it is considered that an analog video signal outputted via this analog output terminal be supplied to a recording device for making a copy.

However, as described above, the information about copy control is embedded on digital video signals recorded on the DVD 100 as an electronic watermark information, and the electronic watermark information embedded on the digital video signals is never removed even if the digital video signals are converted into analog signals.

It is therefore possible to extract, in a recording device which is to be supplied with the analog video signals, the information about copy control embedded as electronic watermark information from the supplied analog video signal, and to conduct appropriate copy control based on the extracted information about copy control.

Also, when a digital video signal recorded on the DVD 100 is outputted as an analog video signal, pseudo synchronization pulses for AGC control can be inserted or the inverse burst control for color stripe can be performed, as shown in FIG. 2B, based on the information about copy control embedded on the digital video signal, i.e., the copy control information and the APS information.

In such a case, as has been also described above, a normally reproduced image can not be obtained depending on the copied analog video signal. In this case, the information about copy control need not be detected from the analog video signal, supplied to a recording device, on which the information is embedded.

Also, when a video signal outputted from the recording/reproducing apparatus of this embodiment or copied on the disc 200 is an information signal which can be copied once (one generation copy permitted), the information about copy control embedded thereon as electronic watermark information is rewritten, for example, in the video data decoder 23 or the recording controller 27, or at any subsequent section so as to prohibit more copies.

The electronic watermark information can be rewritten, for example, by deleting the information about copy control originally embedded on the video signal as the electronic watermark information and then embedding new information about copy control on the video signal as electronic watermark information.

In this way, the electronic watermark information are uniformly embedded on the video signal, so that there is no difference in level between the embedding part for the information about copy control and the embedding part for the additional data, thereby a reproduced image is prevented from being viewed with difficulty.

Second Embodiment

In a second embodiment, the embedding part (first embedding part) AR1 for more significant information about copy control and the embedding part (second embedding part) AR2 for additional data having a lower significance degree than the information about copy control are defined such that they are separated in the vertical direction every one-frame screen of a video signal.

When the embedding parts for additional information having different significance degrees are defined as separate parts in the vertical direction every one-frame screen of a video signal as mentioned above, an authoring apparatus for recording a video signal on which additional information having different significance degrees are embedded as electronic watermark information, on a recording medium, for example, a DVD or the like can be also configured in a similar manner to the authoring apparatus illustrated in FIG. 1.

For this reason, the authoring apparatus of the second embodiment will be explained as configured similarly to the authoring apparatus illustrated in FIG. 1, with reference also to FIG. 1. The second embodiment, however, differs from the first embodiment in timing signals generated in the timing controller 4, as described below.

Figure 9:
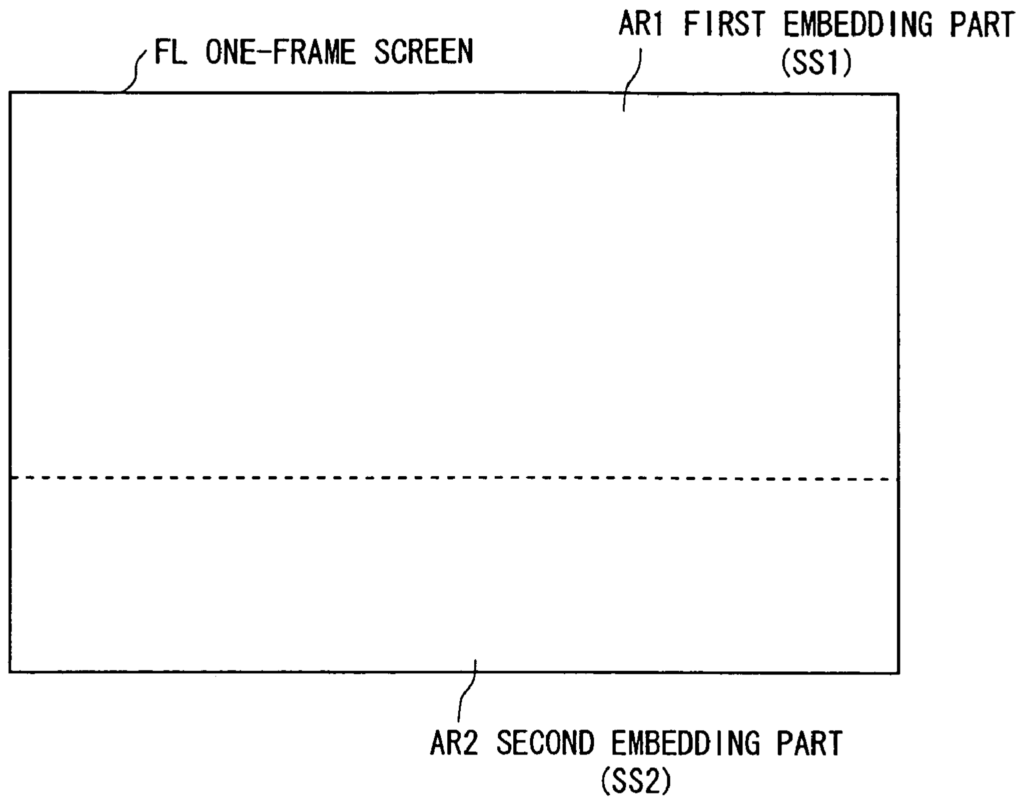
FIG. 9 is a diagram explaining another example of embedding parts for embedding two pieces of additional information having different significance degrees on a video signal as electronic watermark information.

FIG. 9 is a diagram explaining an example of embedding two pieces of additional information having different significance degrees on vertically separated embedding parts every one-frame screen FL. In the second embodiment, as shown in FIG. 9, a one-frame screen (each frame) of a video signal is divided into two in the vertical direction such that the information about copy control having a higher significance degree is embedded in the upper two-third part (first embedding part) AR1 of the screen, and the additional data having less significant than the information about copy control is embedded in the lower one-third part (second embedding part) AR2 of the screen, depending on the significance degrees of the additional information.

Stated another way, the second embodiment is similar to the first embodiment in that the area of the embedding part in which the more significant additional information is embedded as electronic watermark information is set larger-than the embedding part in which the less significant additional information is embedded as electronic watermark information. Also, in this example, the embedding part AR1 for the more significant information about copy control is set twice larger than the embedding part AR2 for the less significant additional data.

FIG. 10 is a diagram explaining timing signals generated in the timing controller 4 in the case where the embedding parts for embedding different additional information as electronic watermark information are separated in the vertical direction on the one-frame screen FL of a video signal, as shown in FIG. 9.

Also, in the second embodiment, the information about copy control as the more significant first additional information and the additional data less significant than the first additional information are embedded such that their cycles are completely fit into one screen of the video signal, as is the case of the aforementioned first embodiment.

Figures 10A, 10B, 10C, 10D, 10E, 10F, 10G:
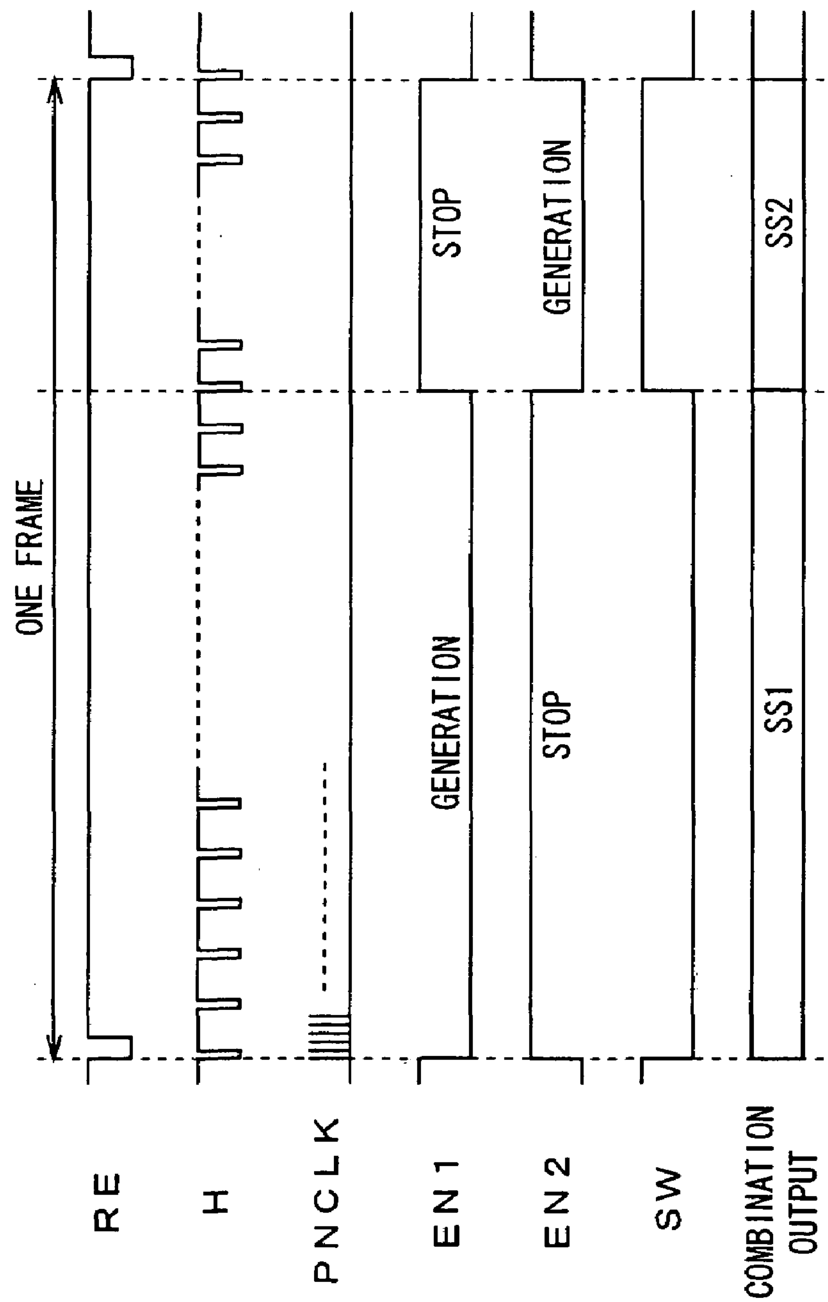
FIGS. 10A to 10G are diagrams explaining timing signals used for embedding additional information as electronic watermark information on the embedding parts shown in FIG. 9, and for detecting the additional information.

For this reason, the reset signal RE is a signal having a period equal to one frame, similar to the reset signal RE in the first embodiment, as illustrated in FIG. 10A, and the clock signal PNCLK is a signal, for example, for providing a timing corresponding to each pixel of the video signal, as illustrated in FIG. 10C.

Then, in the second embodiment, the first enable signal EN1 is formed on the basis of the vertical synchronization signal V and the horizontal synchronization signal H, and is a signal having a period equal to one frame which falls at a leading edge of the vertical synchronizing signal, is at a low level during the former two-third interval of one frame period, and is at a high level during the subsequent one-third interval, as illustrated in FIG. 10D.

In other words, the first enable signal EN1 is a signal formed in each frame such that it is at a low level in a part corresponding to the first embedding part AR1 shown in FIG. 9, and at a high level in a part corresponding to the second embedding part AR2.

The second enable signal EN2 is also formed on the basis of the vertical synchronization signal V and the horizontal synchronization signal H, and is a signal having a period equal to one frame which rises at a leading edge of the vertical synchronization signal, is at a high level during the former two-third interval of one frame period, and is at a low level during the subsequent one-third interval, as illustrated in FIG. 10E.

In other words, the second enable signal EN2, reverse to the first enable signal EN1, is a signal formed in each frame such that it is at a high level in a part corresponding to the first embedding part AR1 shown in FIG. 9, and at a low level in a part corresponding to the second embedding part AR2.

For generating the first enable signal EN1 and the second enable signal EN2, the intervals during which the signals are at a low levels and the intervals at which the signals are at a high levels can be set by counting the horizontal synchronization signal H. Also, in the second embodiment, the first enable signal EN1 and the second enable signal EN2 are both low active.

The combination timing signal SW is formed on the basis of the vertical synchronization signal V and the horizontal synchronization signal H as a signal having a period equal to one frame which falls at the leading edge of the vertical synchronization signal, is at a low level during the former two-third interval of one frame period and is at a high level during the subsequent one-third interval, just like the first enable signal EN1.

Also, similarly to the aforementioned first embodiment, the first PN generator 5 generates a first PN code sequence PS1 using the reset signal RE, the first enable signal EN1 and the clock signal PNCLK, while the second PN generator 7 generates a second PN code sequence PS2 using the reset signal RE, the second enable signal EN2 and the clock signal PNCLK.

The first additional information generator 6 generates an information sequence FS1 concerning copy control at the timing of the first enable signal EN1 based on the clock signal PNCLK, while the second additional information generator 8 generates an additional data sequence FS2 at the timing of the second enable signal EN2 based on the clock signal PNCLK.

Then, the spreader 9 performs the spread spectrum on the information sequence FS1 concerning the copy control with the first PN code sequence PS1 to form electronic watermark information (spread spectrum signal) SS1 which is then supplied to the weighting combiner 11. Similarly, the spreader 10 performs the spread spectrum on the additional data sequence FS with the second PN code sequence PS2 to form electronic watermark information (spread spectrum signal) SS2 which is then supplied to the weighting combiner 11.

The weighting combiner 11, based on the combination timing signal SW, outputs the electronic watermark information SS1 indicating the information about copy control while the combination timing signal SW is at a low level, and outputs the electronic watermark information SS2 indicating the additional data while the combination timing signal SW is at a high level, thereby outputting a combination of the electronic watermark information SS1 indicating the information about copy control and the electronic watermark information SS2 indicating the additional data accommodated in the separate embedding parts allocated thereto.

The combination output from the weighting combiner 11 is embedded on a video signal which has been converted to a digital signal in the A/D converter 2, by the WM embedding section 13. In this case, as shown in FIG. 9, the electronic watermark information SS1 indicating the information about copy control is embedded in the first embedding part AR1 which occupies the upper two-third part of a screen, while the electronic watermark information SS2 indicating the additional data is embedded in the second embedding part AR2 which occupies the lower one-third part of a screen. In this event, the electronic watermark information SS1 and the electronic watermark information SS2 are both embedded on the video signal at the same embedding level.

Thus, as is the case of the authoring apparatus of the first embodiment, the two pieces of additional information having different significance degrees are embedded on the video signal as the electronic watermark information at the same embedding level, so that the embedding of the electronic watermark information on the video signal will not deteriorate an image reproduced from the video signal.

Also, in the authoring apparatus of the second embodiment, the embedding part AR1 for embedding the information about copy control as electronic watermark information is defined to be larger than the embedding part AR2 for embedding the additional data as electronic watermark information, as is the case of the authoring apparatus of the first embodiment.

For this reason, even though the two pieces of additional information are embedded in the same screen, the more significant additional information, which is embedded in the larger area of the video signal, can be more reliably and rapidly detected than the less significant additional information.

Further, with respect to the less significant additional information, which is allocated a smaller embedding area than the more significant additional information, the embedding part is previously set, so that the less significant additional information can also be reliably detected, although a slightly longer detection time is required therefor.

In this way, the authoring apparatus of the second embodiment can also embed two pieces of additional information having different significance degrees on a video signal, in which a reproduced image is not deteriorated and the more significant additional information can be reliably and rapidly detected.

As described above, even when additional information having different significance degrees are embedded in vertically separated embedding parts on a one-frame screen of a video signal as electronic watermark information, the additional information embedded on the video signal can be detected by generating the same PN code sequences as those used for performing the spread spectrum on the electronic watermark information, at the same timing for the video signal, and by de-spreading the electronic watermark information with the thus generated PN code sequences.

Stated another way, a WM decoder for detecting electronic watermark information embedded on a video signal can be configured in a manner similar to the WM decoder 26 previously described with reference to FIG. 8. Then, in the second embodiment, the timing controller 263 in the WM decoder 26 generates the reset signal RE, the first enable signal EN1, the second enable signal EN2 and the clock signal PNCLK, as illustrated in FIG. 10.

Then, the first PN code sequence PN1 and the second PN code sequence PN2 are generated using the respective timing signals generated in the timing controller 263, and used to de-spread the electronic watermark information, thereby making it possible to detect the additional information embedded as the electronic watermark information on the respective vertically separated embedding parts in each screen of the video signal. Thus, the recording/reproducing apparatus of the first embodiment previously described with reference to FIGS. 7 and 8 can be used in the second embodiment by changing the timing signals generated in the timing controller 263 of the WM decoder 26.

Third Embodiment

In a third embodiment, more significant information about copy control and additional data less significant than the information about copy control are embedded in separate frames as electronic watermark information such that they are completely accommodated in each frame, where the number of frames allocated as a embedding part is varied depending on the significance degrees of additional information.

Specifically, the electronic watermark information indicating the more significant information about copy control or the electronic watermark information indicating the additional data less significant than the information about copy control is embedded every frame of a video signal, in which case, the number of frames in which the electronic watermark information indicating the more significant information about copy control is set more than the number of frames in which the electronic watermark information indicating the additional data is embedded.

Also, in this case, an authoring apparatus for recording a video signal on which additional information having different significance degrees are embedded as electronic watermark information, on a recording medium, for example, a DVD or the like, can be configured in a manner similar to the authoring apparatus illustrated in FIG. 1, as is the case of the aforementioned first and second embodiments. For this reason, the authoring apparatus of the third embodiment will be explained assuming that it is configured in a manner similar to the authoring apparatus illustrated in FIG. 1, with reference also to FIG. 1.

However, as will be explained below, the third embodiment differs from the first embodiment in timing signals generated in the timing controller 4.

Figure 11:
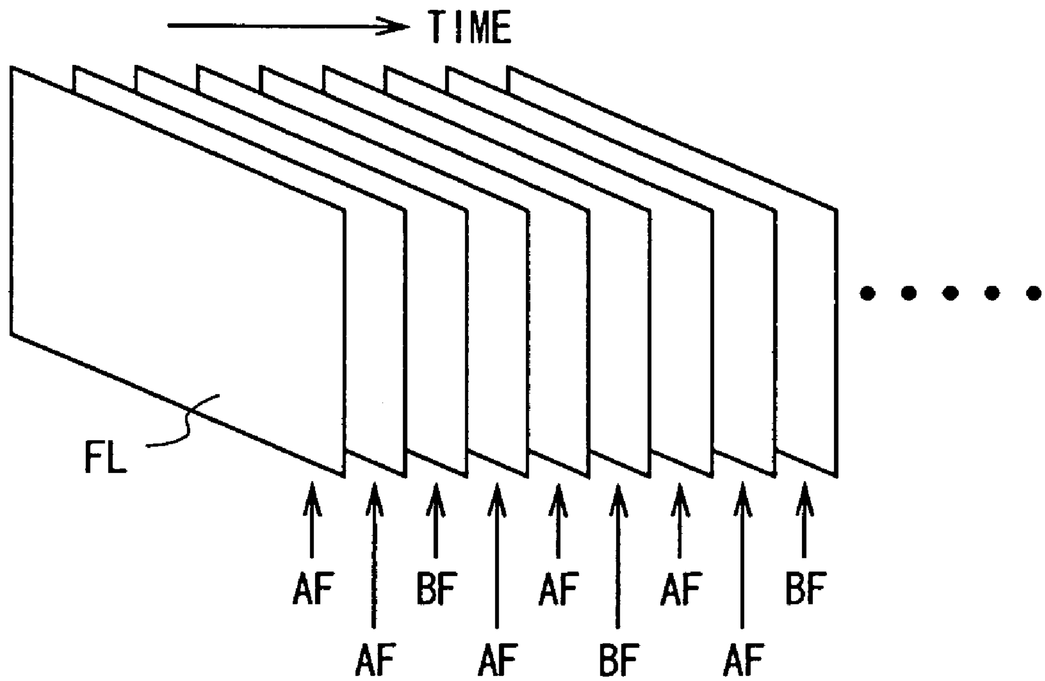
FIG. 11 is a diagram explaining another example of embedding parts for embedding two pieces of additional information having different significance degrees on a video signal as electronic watermark information.

FIG. 11 is a diagram explaining an example of embedding two pieces of additional information having different significance degrees on different frames. In FIG. 11, a frame AF indicates a frame in which the information about copy control is embedded as electronic watermark information, and a frame BF indicates a frame in which the additional data is embedded as electronic watermark information.

Specifically, in the third embodiment, the information about copy control is embedded in consecutive two of every three frames, while the electronic watermark information indicating the additional data is embedded in the remaining one of the same three frames, as illustrated in FIG. 11.

FIG. 12 is a diagram explaining the timing signals generated in the timing controller 4 in the authoring apparatus in the case where the electronic watermark information indicating the information about copy control is embedded in consecutive two of every three frames, and the electronic watermark information indicating the additional data is embedded in the remaining one of the same three frames, as illustrated in FIG. 11.

In the third embodiment, the information about copy control as more significant first additional information and the additional data less significant than the first additional information are embedded such that each of them is accommodated completely in each frame of the video signal.

Figures 12A, 12B, 12C, 12D, 12E, 12F, 12G:
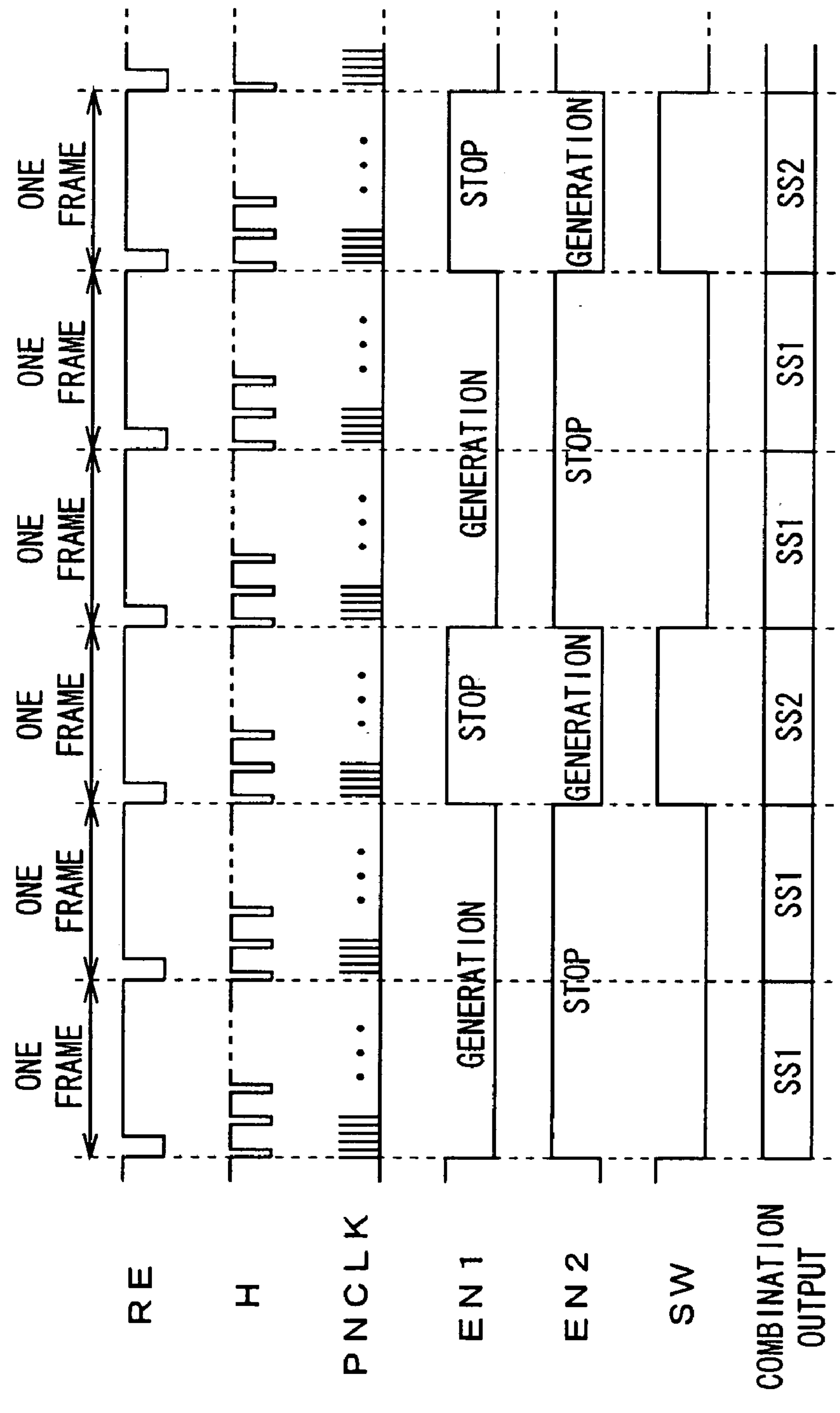
FIGS. 12A to 12G are diagrams explaining timing signals used for embedding additional information as electronic watermark information on the embedding parts shown in FIG. 11, and for detecting the additional information.

For this purpose, as illustrated in FIG. 12A, a reset signal RE is a signal having a period equal to one frame, similar to the reset signals RE of the first and second embodiments. Also, the clock signal PNCLK is a signal, for example, for providing the timing corresponding to each pixel of the video signal, as illustrated in FIG. 12C.

Then, in the third embodiment, the first enable signal EN1 is formed on the basis of the vertical synchronization signal V, and is a signal having a period equal to three frames which falls at a leading edge of the vertical synchronization signal, is at a low level in the subsequent two frames, and is at a high level in the next one frame, as illustrated in FIG. 12D.

In other words, the first enable signal EN1 is a signal formed such that it is at a low level in parts corresponding to the frames AF illustrated in FIG. 11, and at a high level in parts corresponding to the frames BF.

The second enable signal EN2 is also formed on the basis of the vertical synchronization signal V, and is a signal having a period equal to three frames which rises at the leading edge of the vertical synchronization signal, is at a high level in the two frames, and is at a low level in the next one frame, as illustrated in FIG. 12E.

In other words, the second enable signal, reverse to the first enable signal EN1, is at a high level in the parts corresponding to the frames AF illustrated in FIG. 11, and at a low level in the parts corresponding to the frames BF.

For generating the first enable signal EN1 and the second enable signal EN2, the intervals during which the signals are at low levels and the intervals in which the signals are at high levels can be set by counting the vertical synchronization signal V. Also, in the third embodiment, the first enable signal EN1 and the second enable signal EN2 are both low active.

A combination timing signal SW is formed on the basis of the vertical synchronization signal V as a signal having a period equal to three frames, which falls at the leading edge of the vertical synchronization signal, is at a low level in the subsequent two frames, and is at a high level in the next one frame, just like the first enable signal EN1, as illustrated in FIG. 12F.

Then, as is the case of the aforementioned first and second embodiments, the PN code sequence PS1 generated in the first PN generator 5 using the reset signal RE, the first enable signal EN1 and the clock signal PNCLK, is supplied to the de-spreader 9, while the second PN code sequence PS2 generated in the second PN generator 7 using the reset signal RE, the second enable signal EN2 and the clock signal PNCLK is supplied to the de-spreader 10.

Also, an information sequence FS1 concerning the copy control, generated in the first additional information generator 6 at the timing of the first enable signal EN1 based on the clock signal PNCLK, is supplied to the spreader 9, while an additional data sequence FS2 generated in the second additional information generator 8 at the timing of the second enable signal EN2 based on the clock signal PNCLK is supplied to the spreader 10.

Then, as has been also described above, the spreader 9 and the spreader 10 perform the spread spectrum. Consequently, electronic watermark information SS1 indicating the information about copy control is supplied from the spreader 9 to the weighting combiner 11, while electronic watermark information SS2 indicating the additional data is supplied from the spreader 10 to the weighting combiner 11.

The weighting combiner 11, based on the combination timing signal SW, outputs the electronic watermark information SS1 indicating the information about copy control while the combination timing signal SW is at a low level, and outputs the electronic watermark information SS2 indicating the additional data while the combination timing signal SW is at a high level.

The combination output from the weighting combiner 11 is embedded on a video signal, which has been converted to a digital signal in the A/D converter 2, by the WM embedding section 13. In this case, as illustrated in FIG. 11 and also in FIG. 12G, the electronic watermark information SS1 indicating the information about copy control is embedded in consecutive two frames of every three frames such that it is completely accommodated in each frame, and the electronic watermark information SS2 indicating the additional data is embedded in the remaining one of the every three frames. Also, in this case, the electronic watermark information SS1 and the electronic watermark information SS2 are both embedded on the video signal at the same embedding level.

Thus, as is the case of the authoring apparatus of the first and second embodiments, the two pieces of additional information having different significance degrees are embedded on the video signal as the electronic watermark information at the same embedding level, so that the embedding of the electronic watermark information on the video signal will not deteriorate in an image reproduced from the video signal.

Also, in the authoring apparatus of the third embodiment, the embedding part for the information about copy control as electronic watermark information is larger than the embedding part for the additional data as electronic watermark information, as is the case of the authoring apparatus of the first and second embodiments.

For this reason, the more significant additional information, which is embedded in the larger area of the video signal, can be more reliably and rapidly detected than the less significant additional information.

Further, with respect to the less significant additional information, which is allocated a smaller embedding area than the more significant additional information, the embedding part is previously set, so that the less significant additional information can also be reliably detected, although a slightly longer detection time is required therefor.

In this way, the authoring apparatus of the third embodiment can also embed two pieces of additional information having different significance degrees on a video signal in such a manner that a reproduced image will not be degraded and the more significant additional information can be reliably and rapidly detected.

As described above, even when additional information having different significance degrees are embedded on a video signal as electronic watermark information, as is the case of the third embodiment, the additional information embedded on the video signal can be detected by generating the same PN code sequences as those used for performing the spread spectrum on the electronic watermark information embedded on the video signal, at the same timing for the video signal, and de-spreading the electronic watermark information with the thus generated PN code sequences.

Stated another way, a WM decoder for detecting the electronic watermark information embedded on a video signal can be configured in a manner similar to the WM decoder 26 previously described with reference to FIG. 8. Then, in the third embodiment, the timing controller 263 in the WM decoder 26 generates the reset signal RE, the first enable signal EN1, the second enable signal EN2, the clock signal PNCLK and the combination timing signal SW, as illustrated in FIGS. 12A to 12G.

Then, the first PN code sequence PN1 and the second PN code sequence PN2 are generated using the timing signals generated in the timing controller 263, and used to de-spread the electronic watermark information, thereby making it possible to detect the additional information embedded as the electronic watermark information on the respective vertically separated embedding parts in each screen of the video signal. Thus, the recording/reproducing apparatus of the first embodiment previously described with reference to FIGS. 7 and 8 can be used in the third embodiment by changing the timing signals generated in the timing controller 263 of the WM decoder 26.

Note that, in the foregoing embodiments, the information about copy control and the additional data are embedded as electronic watermark information within a one-frame screen of a video signal, i.e., on an image of one frame. However, the present invention is not limited to this case. Alternatively, the information about copy control and the additional data as electronic watermark information can of course be separately embedded in the different embedding parts of a one-field screen of a video signal, i.e., of one field of image.

Stated another way, the additional information to be embedded on a video signal can of course be separately embedded in embedding parts on a frame basis or be separately embedded in embedding parts on a field basis.

Further, in the foregoing embodiments, two pieces of additional information having different significance degrees (the information about copy control and the additional data) are embedded on a video signal as electronic watermark information. However, the number of additional information having different significance degrees is not limited to two. Any plural pieces of information having different significance degrees can be embedded on a video signal. In addition, the data length of each additional information is not limited to four bits but can be one bit or more.

For example, in the case where three or four pieces of additional information having different significance degrees are embedded on a video signal as electronic watermark information, embedding parts for embedding the respective additional information as electronic watermark information can be defined depending on the significance degrees of the additional information.

Also, for example, in the case where three additional information having different significance degrees are embedded on a video signal, with one of them has a higher significance degree and the remaining two having similarly a low significance degree, it will be taken as granted that a larger embedding part can be allotted to the more significant additional information as electronic watermark information, while similar embedding parts can be allotted to the remaining two pieces of additional information.

Further, in the case where two pieces of additional information having different significance degrees are embedded within one screen, embedding parts can be subdivided, for example, in such a manner that the first ten horizontal lines are is allocated for embedding electronic watermark information indicating the more significant additional information, the next five horizontal lines are allocated for embedding electronic watermark information indicating the less significant additional information, the next ten horizontal lines are allocated for embedding electronic watermark information indicating the more significant additional information.

In essence, the embedding part for embedding the electronic watermark information indicating the more significant additional information is only required to be larger than the embedding part for embedding the electronic watermark information indicating the less significant additional information.

Further, in the foregoing embodiments, the embedding parts are previously defined for the two pieces of additional information. However, a user can specify the sizes of the embedding parts for the additional information, for example, through the key manipulation unit. Then, the controller can supply the timing controller with a control signal for generating timing signals in accordance with the instructions from the user, thereby making it possible to embed the additional information as electronic watermark information on embedding parts having the sizes specified by the user.

Further, in the foregoing embodiments, the electronic watermark information is formed by performing the spread spectrum on additional information using a PN code sequence. The spread codes used for the spread spectrum are not limited to the PN codes, but a variety of spread codes may be used instead.

Furthermore, in the foregoing embodiments, the electronic watermark information is embedded on a video signal before the data compression. However, the electronic watermark information can of course be embedded on a video signal which has been subjected to the data compression.

Also, the electronic watermark information is not limited to those formed by the spread spectrum, but can be formed using a variety of electronic watermark techniques. For example, predefined electronic watermark information, referred to as "unit electronic watermark information" (unit watermark) can be previously prepared for each additional information to be embedded on a video signal, and can be embedded on a video signal.

When this unit electronic watermark information is used, a plurality of unit electronic watermark information are simultaneously generated corresponding to plural pieces of additional information, such that the unit electronic watermark information to be embedded can be switched for each of predefined embedding parts in accordance with the significance degrees of the additional information. This embedding scheme can be supported such that the respective unit electronic watermark information corresponding to the additional information can be switched, for example, in the aforementioned weighting combiner 11 at the timing of the combination timing signal SW from the timing controller 4.

Further, even when electronic watermark information indicating additional information having different significance degrees are formed, for example, by the spread spectrum, electronic watermark information can be generated and held in accordance with embedding parts defined depending on the significance degrees of the additional information, and for example, the weighing combiner can combine them at the timing of the combination timing signal in such a manner that they are separately embedded in respective embedding parts.

Further, in the foregoing embodiments, the additional information embedding method and additional information embedding apparatus according to the present invention are applied to an authoring apparatus for a DVD, and the additional information detecting method and additional information detecting apparatus are applied to a recording/reproducing apparatus. However, the present invention is not limited to such particular applications.

The additional information embedding method and additional information embedding apparatus according to the present invention can be applied to a broadcasting related devices for use in a broadcasting station for broadcasting video signals; information processing apparatus such as personal computers capable of transmitting and receiving information signals such as video signals; or a variety of output devices for outputting video signals such as a video signal reproducing apparatus having a function of embedding electronic watermark information.

The additional information detecting method and additional information detecting apparatus according to the present invention can be applied to receivers, referred to as a set top box or a cable box, for receiving broadcast signals from broadcasting stations; a variety of recording apparatus and recording/reproducing apparatus; or information processing apparatus such as personal computers capable of transmitting and receiving video signals, i.e., a variety of apparatus which receives video signals provided thereto and processes the provided video signals.

Also, the foregoing embodiments have been explained for an example in which electronic watermark information are embedded on a video signal. However, the present invention can also be applied when electronic watermark information are embedded on an audio signal, computer data, and so on.

As explained above, according to the additional information embedding method of this invention, when additional information are embedded on a video signal as electronic watermark information, they can be embedded on the video signal so as to more readily detect an additional information having a higher significance degree.

Also, according to the additional information embedding method of this, plural pieces of additional information having different significance degrees can be embedded as electronic watermark information within a one-frame or one-field screen of a video signal so as to more readily detect additional information having a higher significance degree.

Further, according to the additional information embedding method of this invention, since a embedding part allocated to additional information having a higher significance degree is provided with a larger number of frames or a larger number of fields, which comprise the embedding part, plural pieces of additional information having different significance degrees can be embedded on a video signal as electronic watermark information so as to more readily detect additional information having a higher significance degree.

Further, according to the additional information embedding method of this invention, plural pieces of additional information having different significance degrees can be embedded as electronic watermark information on a video signal at a uniform embedding level without the need for varying the embedding levels for the additional information as electronic watermark information in accordance with their significance degrees, in order to more readily detect electronic watermark information indicating additional information having a higher significance degree than electronic watermark information indicating additional information having a lower significance degree. In this way, since no difference in level will be produced among their embedding parts in which the respective additional information are embedded as electronic watermark information, the embedding of the additional information as electronic watermark information on the video signal will not deteriorate a reproduced image from the video signal.

Further, according to the additional information embedding apparatus and method, it is possible to reliably detect each of plural pieces of additional information having different significance degrees embedded on a video signal as electronic watermark information, wherein additional information having a higher significance degree can be more reliably and rapidly detected.

Further, since a embedding part for embedding electronic watermark information indicating additional information having a higher significance degree is set to have a larger area within a one-frame or one-field screen, the additional information having a higher significance degree can be more reliably and rapidly detected. In addition, it is possible to reliably detect each of plural pieces of additional information having different significance degrees which are embedded in a one-frame or one-field screen of a video signal as electronic watermark information.

Further, since a embedding part in which additional information having a higher significance degree is embedded as electronic watermark information is set to have a larger number of frames or a larger number of fields which comprise the embedding part, the additional information having a higher significance degree can be more reliably and rapidly detected. In addition, it is possible to reliably detect each of plural pieces of additional information having different significance degrees which are embedded as electronic watermark information.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An additional information embedding apparatus for embedding plural pieces of additional information having different significance degrees on a signal, comprising:

means for generating said plural pieces of additional information;

electronic watermark information generating means for converting said plural pieces of additional information into electronic watermark information;

control means for controlling the size of a embedding part of a video signal for each of said electronic watermark information in accordance with the significance degree of the corresponding additional information; and embedding means for embedding said electronic watermark information on said video signal based on a control signal from said control means.

2. The additional information embedding apparatus according to claim 1, wherein:

said signal is a video signal; and said control means controls said embedding means so that each of said electronic watermark information is embedded within a one-frame screen or a one-field screen of said video signal, and that a embedding part for electronic watermark information indicating additional information having a higher significance degree is set to be larger in size.

3. The additional information embedding apparatus according to claim 1, wherein:

said signal is a video signal; and said control means controls said embedding means so that each of said electronic watermark information is embedded on a one- or plural-frame basis of said video signal or on one- or plural-filed basis of said video signal, wherein a embedding part for electronic watermark information indicating additional information having a higher significance degree is set to occupy a larger number of frames or a larger number of fields which constitute said embedding part.

4. The additional information embedding apparatus according to claim 1, wherein said embedding means embeds said plural pieces of electronic watermark information having different significance degrees are embedded on said video signal at embedding levels equal to one another.

5. An additional information embedding apparatus comprising:

a plurality of additional information generating means for generating additional information having different significance degrees;

a plurality of electronic watermark information generating means provided correspondingly to said plurality of additional information generating means for generating plural pieces of electronic watermark information from said additional information obtained by said additional information generating means;

combining means for combining said plural pieces of electronic watermark information obtained by said plurality of electronic watermark information generating means while they are assigned to separate embedding parts;

combination timing signal generating means for producing a combination timing signal used for controlling a combination timing of said combining means so that the size of the embedding part of a video signal for each of said plural pieces of additional information having different significance degrees is set in accordance with the significance degree of the corresponding additional information; and embedding means for embedding the combined electronic watermark information obtained by said combining means, on said video signal.

6. The additional information embedding apparatus according to claim 5, wherein said combination timing signal generating means generates said combination timing signal so that said plural pieces of the electronic watermark information from said plurality of electronic watermark information generating means are embedded within a one-frame or one-field screen of said video signal, and that a embedding part for electronic watermark information indicating additional information having a higher significance degree is set to be larger in size.

7. The additional information embedding apparatus according to claim 5, wherein said combination timing signal generating means generates said combination timing signal so that said plural pieces of electronic watermark information obtained by said plurality of electronic watermark information generating means are embedded with one or plural frame(s) of said video signal or on one or plural field(s) of said video signal as a embedding part unit, and that a embedding part for electronic watermark information indicating additional information having a higher significance degree is set to occupy a larger number of frames or a larger number of fields which constitute said embedding part.

8. The additional information embedding apparatus according to claim 5, wherein said plural pieces of electronic watermark information respectively indicating said plural pieces of additional information having different significance degrees are embedded on said video signal at embedding levels equal to one another.

9. An additional information detecting apparatus for detecting plural pieces of additional information from a video signal on which said plural pieces of additional information are embedded as electronic watermark information, wherein:

said plural pieces of electronic watermark information respectively indicating said plural pieces of additional information are separately embedded in embedding parts, and the size of each embedding part of a video signal is set in accordance to the significance degree of the corresponding additional information; and said additional information detecting apparatus comprises:

detecting means for detecting additional information as electronic watermark information from said each embedding part of said video signal which is set in accordance with the significance degree of said corresponding additional information; and detection timing signal generating means for producing a detection timing signal used for detecting additional information and supplying it to said detecting means, for said each embedding part of said video signal which is set in accordance with the significance degree of said corresponding additional information.

10. The additional information detecting apparatus according to claim 9, wherein in the case where said signal is a video signal, said plural pieces of electronic watermark information respectively indicating said plural pieces of additional information having different significance degrees are embedded within a one-frame or one-field screen of said video signal, and the embedding parts for said plural pieces of electronic watermark information respectively indicating said plural pieces of additional information are set in such a manner that a embedding part for electronic watermark information indicating additional information having a higher significance degree is set to be larger in size in said one-frame or one-field screen.

11. The additional information detecting apparatus according to claim 9, wherein in the case where said signal is a video signal, said plural pieces of electronic watermark information respectively indicating said plural pieces of additional information having different significance degrees are embedded on a one- or plural-frame basis of said video signal or on a one- or plural-field basis of said video signal, and a embedding part for electronic watermark information indicating additional information having a higher significance degree is set to occupy a larger number of frames or a larger number of fields which constitute said embedding part.

12. An additional information embedding method of embedding plural pieces of additional information having different significance degrees on a video signal, comprising:

a step of generating said plural pieces of additional information;

an electronic watermark information generating step of converting said plural pieces of additional information into electronic watermark information;

a control step of controlling the size of a embedding part of a video signal for each of said plural pieces of electronic watermark information in accordance with the significance degree of the corresponding additional information; and a embedding step of embedding said plural pieces of electronic watermark information on said video signal based on a control signal from said control step.

13. The additional information embedding method according to claim 12, wherein:

said signal is a video signal; and said control step controls said embedding step so that each of said plural pieces of electronic watermark information is embedded within a one-frame or one-field screen of said video signal and that a embedding part for electronic watermark information indicating additional information having a higher significance degree is set to be larger in size.

14. The additional information embedding method according to claim 12, wherein:

said signal is a video signal; and said control step controls said embedding step so that each of said plural pieces of electronic watermark information is embedded on a one- or plural-frame basis or a one- or plural-field basis of said video signal, and that a embedding part for electronic watermark information indicating additional information having a higher significance degree is set to occupy a larger number of frames or a larger number of fields which constitute said embedding part.

15. The additional information embedding method according to claim 12, wherein said embedding step embeds said plural pieces of electronic watermark information having different significance degrees on said video signal at embedding levels equal to one another.

16. An additional information detecting method of detecting plural pieces of additional information from a video signal on which said plural pieces of additional information are embedded as electronic watermark information, wherein:

said plural pieces of electronic watermark information respectively indicating said plural pieces of additional information are separately embedded in respective embedding parts, and the size of each embedding part of a video signal is set in accordance with the significance degree of the corresponding additional information; and said additional information detecting method comprises:

a detecting step of detecting additional information indicated by electronic watermark information, from said each embedding part of said video signal which is set in accordance with the significance degree of said corresponding additional information; and a detection timing signal generating step of generating a detection timing signal for detecting said additional information and supplying it to said detecting step, for said each embedding part of said video signal which is set in accordance with the significance degree of said corresponding additional information.

17. The additional information detecting method according to claim 16, wherein in the case where said signal is a video signal, each of said plural pieces of electronic watermark information respectively indicating said plural pieces of additional information having different significance degrees is embedded within a one-frame or one-field screen of said video signal, and embedding parts for said plural pieces of electronic watermark information respectively indicating said plural pieces of additional information are set in such a manner that a embedding part for electronic watermark information indicating additional information having a higher significance degree is set to be larger in size in said one-frame or one-field screen.

18. The additional information detecting method according to claim 16, wherein in the case where said signal is a video signal, each of said plural pieces of the electronic watermark information indicating said plural pieces of additional information having different significance degrees is embedded with one or plural frame(s) or one or plural field(s) of said video signal as a embedding part unit, and a embedding part for embedding electronic watermark information indicating additional information having a higher significance degree is set to occupy a larger number of frames or a larger number of fields which constitute said embedding part.

* * * * *

UNITED STATES PATENT AND TRADEMARK OFFICE

CERTIFICATE OF CORRECTION

PATENT NO. : 6,954,856 B1
APPLICATION NO. : 09/510438
DATED : October 11, 2005
INVENTOR(S) : Takashi Kohashi et al.

It is certified that error appears in the above-identified patent and that said Letters Patent is hereby corrected as shown below:

In claim 1, column 27, line 12, "a embedding" should read --an embedding--.

In claim 2, column 27, line 25, "a embedding" should read --an embedding--.

In claim 3, column 27, line 35, "plural-filed" should read --plural-field--.

In claim 3, column 27, line 36, "a embedding" should read --an embedding--.

In claim 4, column 27, line 45, delete "are embedded".

In claim 6, column 28, lines 14-15, "a embedding" should read --an embedding--.

In claim 7, column 28, line 26, "a embedding" should read --an embedding--.

In claim 7, column 28, line 27, "a embedding" should read --an embedding--.

In claim 10, column 29, line 6, "a embedding" should read --an embedding--.

In claim 11, column 29, line 19, "a embedding" should read --an embedding--.

In claim 12, column 29, line 32, "a embedding" should read --an embedding--.

In claim 12, column 29, line 37, "a embedding" should read --an embedding--.

In claim 13, column 29, line 46, "a embedding" should read --an embedding--.

In claim 14, column 29, line 57, "a embedding" should read --an embedding--.

UNITED STATES PATENT AND TRADEMARK OFFICE

CERTIFICATE OF CORRECTION

PATENT NO. : 6,954,856 B1
APPLICATION NO. : 09/510438
DATED : October 11, 2005
INVENTOR(S) : Takashi Kohashi et al.

It is certified that error appears in the above-identified patent and that said Letters Patent is hereby corrected as shown below:

In claim 17, column 30, line 42, “a embedding” should read --an embedding--.

In claim 18, column 30, line 54, “a embedding” should read --an embedding--. (both occurrences)

Signed and Sealed this

Second Day of January, 2007

JON W. DUDAS

*Director of the United States Patent and Trademark Office*